United States Patent
Okada

(10) Patent No.: US 7,943,897 B2
(45) Date of Patent: May 17, 2011

(54) OPTICAL ENCODER AND ELECTRONIC EQUIPMENT

(75) Inventor: Norikazu Okada, Kashihara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 425 days.

(21) Appl. No.: 12/139,164

(22) Filed: Jun. 13, 2008

(65) Prior Publication Data

US 2008/0315135 A1 Dec. 25, 2008

(30) Foreign Application Priority Data

Jun. 20, 2007 (JP) ................ P2007-162350
Mar. 18, 2008 (JP) ................ P2008-069475

(51) Int. Cl.
*G01D 5/34* (2006.01)
(52) U.S. Cl. ......... 250/231.13; 250/231.14; 250/231.16
(58) Field of Classification Search . 250/231.13–231.18
See application file for complete search history.

(56) References Cited

U.S. PATENT DOCUMENTS

| | | | |
|---|---|---|---|
| 4,451,731 A | 5/1984 | Leonard | |
| 5,068,529 A * | 11/1991 | Ohno et al. | 250/231.18 |
| 6,392,224 B1 * | 5/2002 | Holzapfel et al. | 250/231.13 |
| 6,914,235 B2 * | 7/2005 | Benner et al. | 250/231.13 |
| 7,223,963 B2 | 5/2007 | Okada et al. | |
| 7,276,687 B2 | 10/2007 | Okada | |
| 2007/0045526 A1 | 3/2007 | Saidan et al. | |

FOREIGN PATENT DOCUMENTS

| | | |
|---|---|---|
| JP | 58-37515 A | 3/1983 |
| JP | 60-88316 A | 5/1985 |
| JP | 2-49113 A | 2/1990 |
| JP | 6-7013 U | 1/1994 |
| JP | 6-14908 U | 2/1994 |
| JP | 10-332431 A | 12/1998 |
| JP | 2001-43475 A | 2/2001 |
| JP | 2003-294494 A | 10/2003 |
| JP | 2005-61896 A | 3/2005 |
| JP | 2006-84458 A | 3/2006 |
| JP | 2007-64981 A | 3/2007 |

* cited by examiner

*Primary Examiner* — Georgia Y Epps
*Assistant Examiner* — Kevin Wyatt
(74) *Attorney, Agent, or Firm* — Birch, Stewart, Kolasch & Birch, LLP

(57) ABSTRACT

This optical encoder includes a light emitting section and a plurality of light receiving elements placed so as to be aligned in one direction in an area where a light beam from the light emitting section may reach. A moving object includes a light-ON section, a light-OFF section and an index pattern section. The light receiving element outputs a first light receiving signal when the light-ON section and the light-OFF section of the moving object pass through a predetermined position corresponding to the light receiving element. The light receiving element outputs a second light receiving signal when the index pattern section of the moving object passes through a predetermined position corresponding to the light receiving element. The output section outputs an incremental channel signal indicating movement information of the moving object based on the first light receiving signal while outputting an index channel signal indicating reference position of the moving object based on the second light receiving signal. The incremental channel signal and the index channel signal are out of phase with each other.

4 Claims, 22 Drawing Sheets

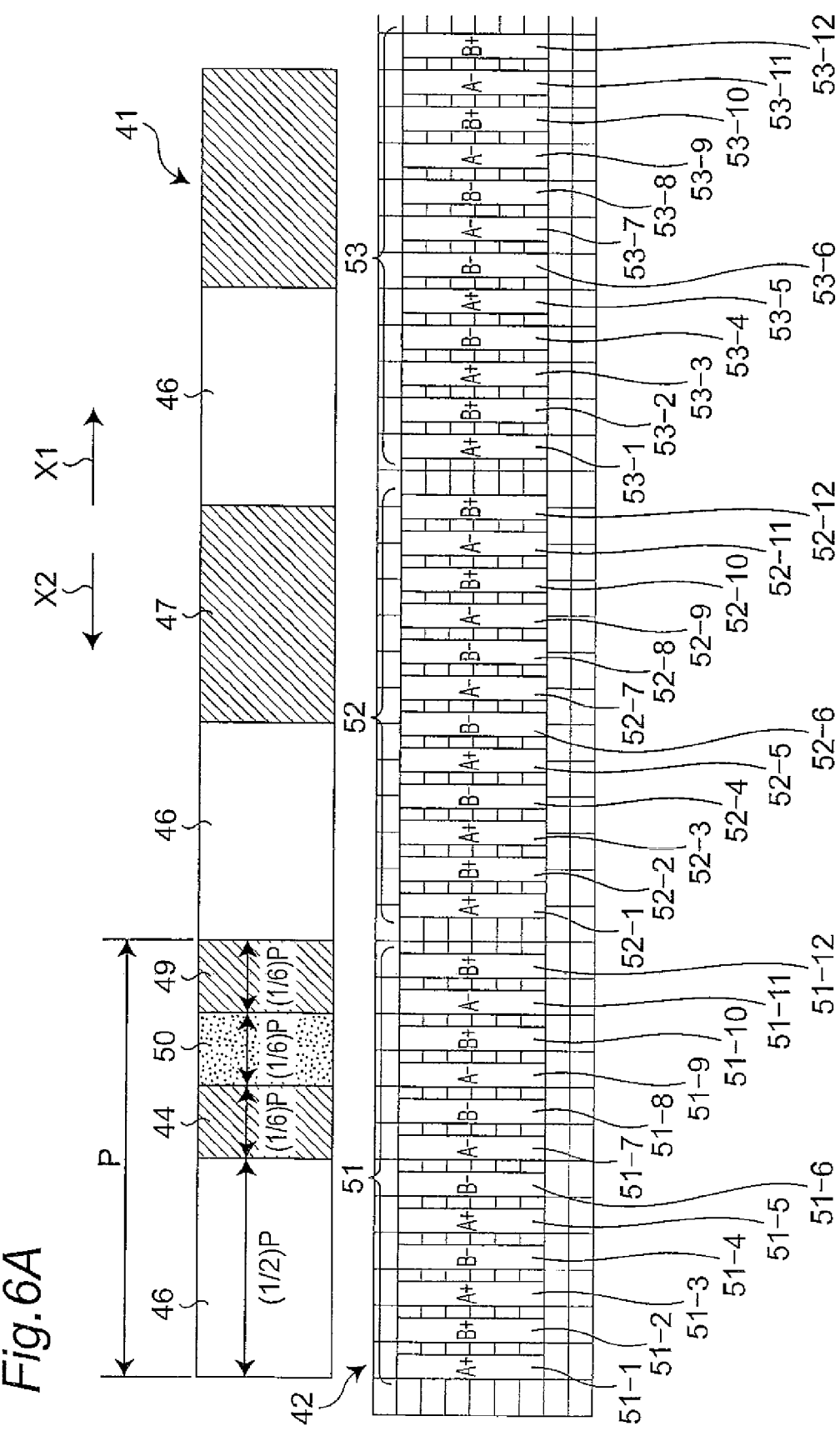

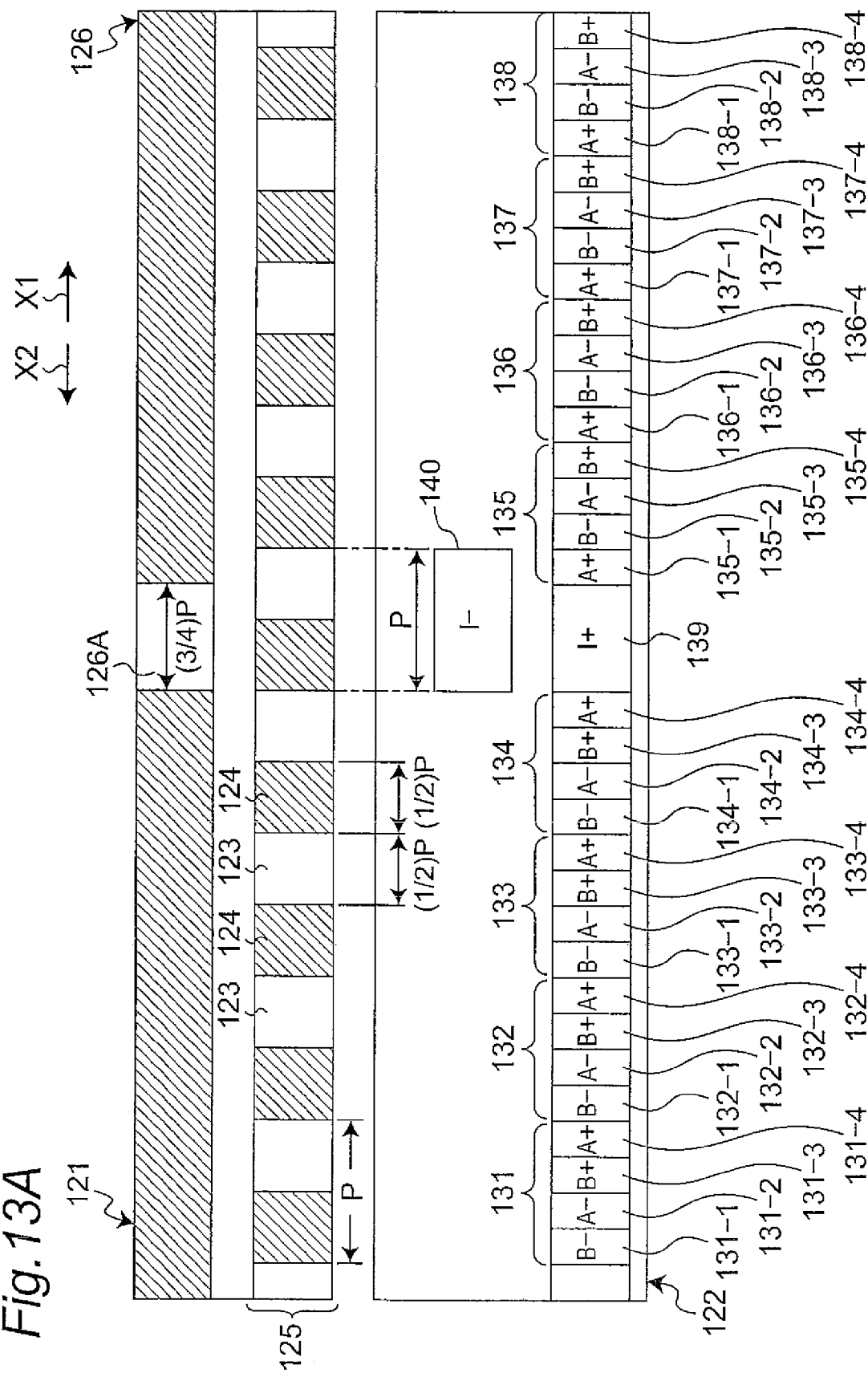

Fig.13D
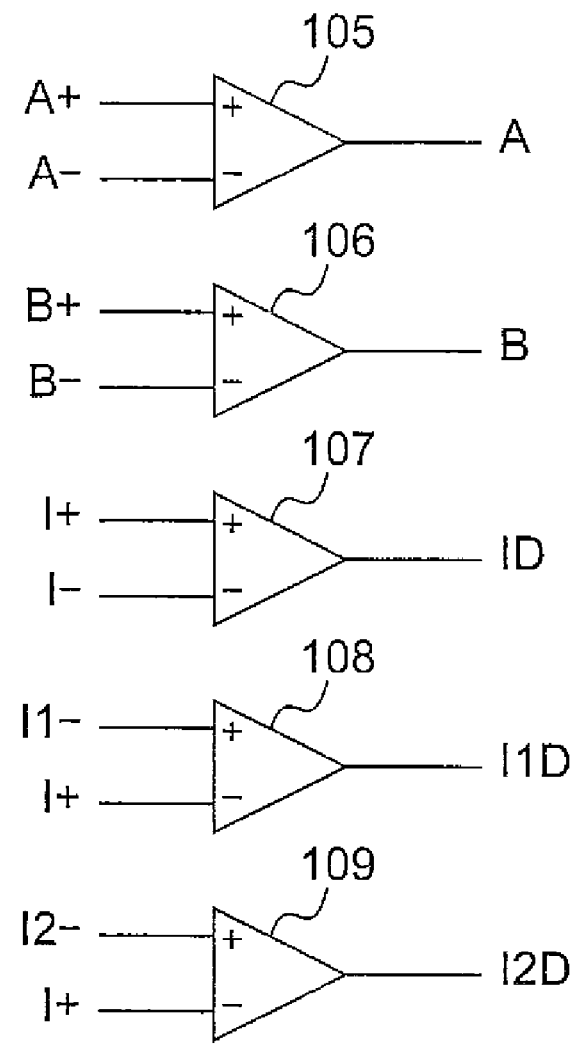
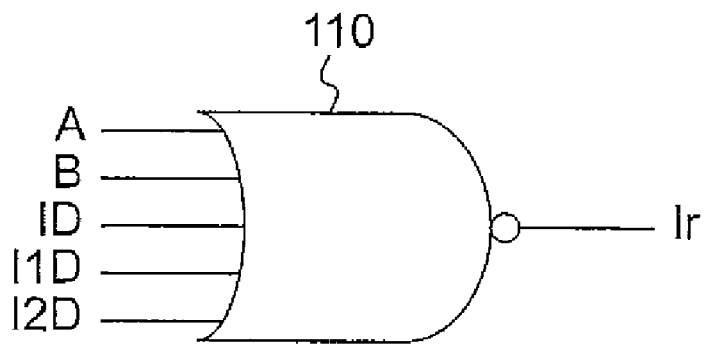

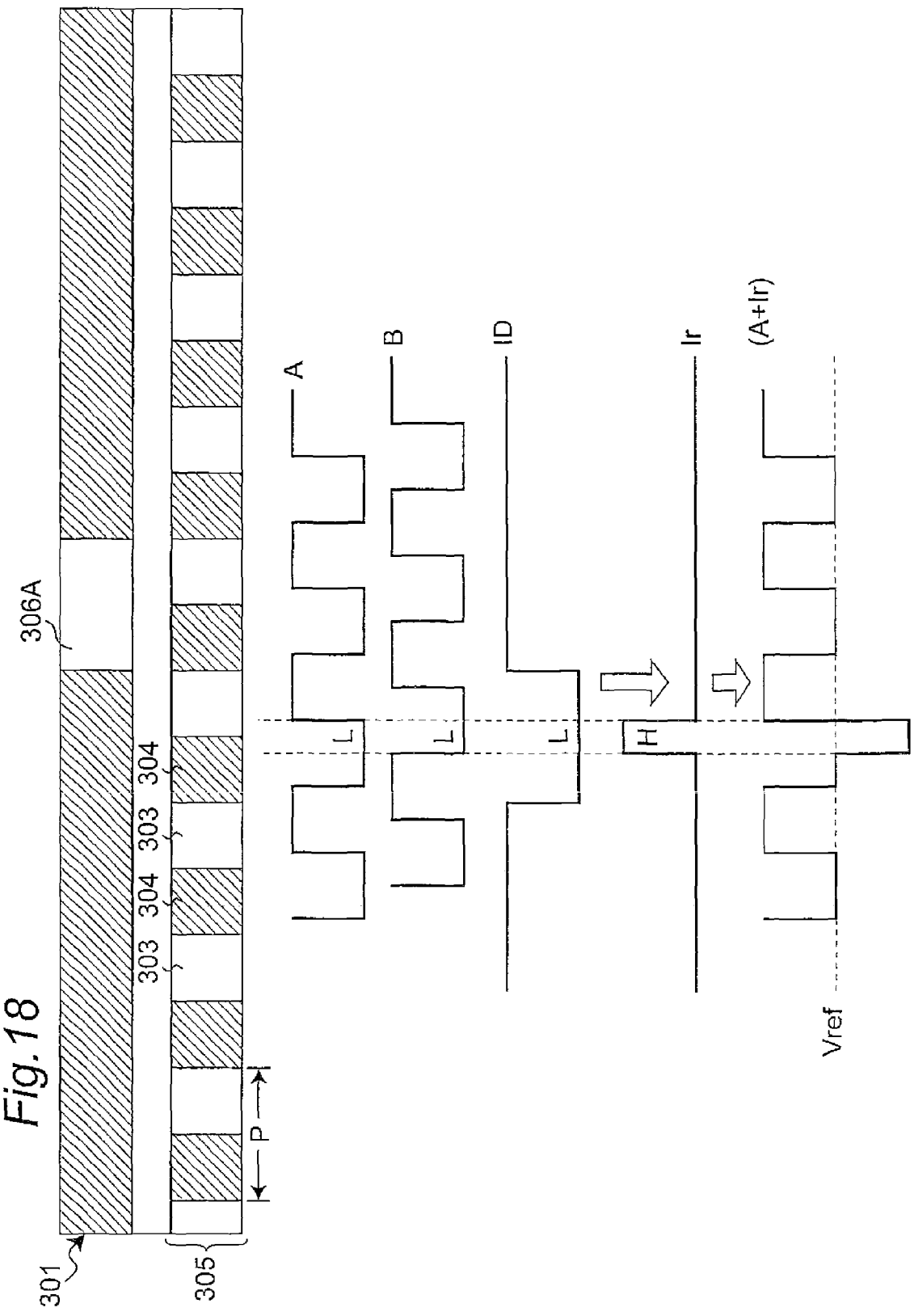

OPTICAL ENCODER AND ELECTRONIC EQUIPMENT

CROSS-REFERENCE TO RELATED APPLICATIONS

This Nonprovisional application claims priority under 35 U.S.C. §119(a) on Patent Application No. 2007-162350 filed in Japan on Jun. 20, 2007 and Patent Application No. 2008-069475 filed in Japan on Mar. 18, 2008, the entire contents of which are hereby incorporated by reference.

BACKGROUND OF THE INVENTION

The present invention relates to an optical encoder for detecting the position, the movement speed, the moving direction and the like of a moving object with use of a light receiving element, and more specifically relates to an optical encoder which is preferably used for, for example, copying machines, printers or other printing equipment, as well as FA (Factory Automation) equipment.

JP H6-7013 U discloses a conventional optical encoder which has an encoder plate with an index track placed in the center and an incremental track placed on the outer circumference. This optical encoder stabilizes an index channel signal obtained from the index track and detects a reference position of the encoder plate with the stabilized index channel signal, while detecting movement of the encoder plate with an incremental channel signal obtained from the incremental track.

JP S58-37515 A discloses that two slits are placed on a code disc at an uneven interval so as to obtain an index channel signal with a high peak value. In the technique disclosed in JP S58-37515 A, a series of scales having a light-ON section and a light-OFF section include an index pattern in addition to an incremental pattern. The technique in JP S58-37515 A makes it possible to reduce a light emitting area and a light receiving area of the optical encoder.

In an optical encoder disclosed in JP 2007-64981 A, a moving object has a series of scales which include an incremental pattern and an index pattern, and an index channel signal is generated by logically combining outputs from at least three photodiodes in a photodiode array which outputs incremental channel signals as a movement signal of the moving object.

In the above-mentioned optical encoder in JP H6-7013 U, the index track is placed in the center of a light receiving section in order to detect an index channel signal with sufficient precision for origin detection (reference position detection). Thus, in the method for obtaining an index channel signal by placing the index track away from the incremental track, not only an optical area to use is widened, but also it is necessary to produce parallel beams corresponding to the wide optical area as well as to secure a light receiving area, which results in cost increase.

In the above-mentioned optical encoder in JP S58-37515 A, the index channel signal different in peak value from the incremental channel signal causes the incremental channel signal to have phase distortion and shift, and thereby movement detecting characteristics may be deteriorated.

In the above-mentioned optical encoder in JP 2007-64981 A, when the photodiode array which outputs an incremental channel signal is used as it is for obtaining an index channel signal, the phase shift of the incremental channel signal increases upon incidence of light into the index pattern due to pattern difference between an incremental pattern and an index pattern, which may deteriorate movement detecting characteristics.

An optical encoder disclosed in JP 2003-294494 A is composed of a plurality of light receiving elements with different light receiving surfaces including photodiodes ZPD 1 to 4 for origin detection and a circuit for processing detection signals from these light receiving elements, the circuit including a capacitor for correcting the detection signals, and the optical encoder detects a differential signal with a differential amplifier to detect the position of an origin. However, in JP 2003-294494 A, the light receiving surface areas of the photodiodes ZPD 1 to 4 for origin detection are different from the light receiving surface areas of photodiodes ZBPD 1 to 4 for non-origin detection, and therefore even with correction performed, variations in light receiving amount and the correction is not always correlated, which may prevent accurate detection of the position of the origin.

In an optical encoder in JP 2005-61896 A, n signals representing the amount of change of a moving object is obtained by providing the moving object with m slits arranged in the moving direction, arranging k photodiodes in a row wherein k is a common multiplier of n and m, and adding together output signals from a plurality of photodiodes among k photodiodes to obtain n movement information signals representing the amount of change of the moving object.

Further, an optical encoder disclosed in JP 2006-84458 A has photodiodes arranged, the number of the photodiodes being expressed as a product of the number of independent movement information signals with a power of the number of light transmission areas facing a light receiving section.

Although the light receiving surface of each photodiode is reduced and the photodiode is subdivided to obtain precise movement information signals in JP 2005-61896 A and JP 2006-84458 A, the index channel signal for detecting the reference position of a moving object is not obtained by these technologies.

SUMMARY OF THE INVENTION

Accordingly, an object of the present invention is to provide an optical encoder capable of obtaining movement information and reference position information with sufficient precision at low cost.

In order to solve the problem, an optical encoder comprises:
a light emitting section; and
a light receiving section having a plurality of light receiving elements placed so as to be aligned in one direction in an area where a light beam from the light emitting section may reach, for detecting movement of a moving object which is composed of a light-ON section for enabling the light beam to come incident into the light receiving element when the moving object passes through a predetermined position corresponding to the light receiving element, and a light-OFF section for disabling the light beam from coming incident into the light receiving element when the moving object passes through a predetermined position corresponding to the light receiving element, the light-ON section and the light-OFF section alternately passing through the predetermined position when the moving object moves in the one direction, the moving object also including an index pattern section placed in a predetermined reference position, the optical encoder further comprising an output section for receiving inputs of a first light receiving signal outputted by the light receiving element when the light-ON section and the light-OFF section of the moving object pass through the predetermined position corresponding to the light receiving element and a second light receiving signal outputted by the light receiving element when the index pattern section of the moving object passes through the predetermined position corresponding to the light receiving element, the output section outputting an incremental channel signal indicating movement information of the moving object based on at least the first light receiving signal out of the first and the second light receiving signals, while outputting an index channel signal indicating the reference position of the moving object based on at least the second light receiving signal out of the first and the second light receiving signals, wherein the incremental channel signal and the index channel signal are out of phase with each other.

According to the optical encoder of this invention, the index channel signal indicating the reference position of a moving object is out of phase with the incremental channel signal indicating the movement information of the moving object, so that mutual interference between the index channel signal and the incremental channel signal can be suppressed. Therefore, the phase shift and distortion of the incremental channel signal can be suppressed, and thereby the movement information and the reference position information can be acquired with sufficient precision at low cost.

In the optical encoder of one embodiment, the output section electrically adds together light receiving signals with different phases outputted by a plurality of the light receiving elements and outputs the incremental channel signal.

In the optical encoder of this embodiment, the incremental channel signal is formed by electrically adding together light receiving signals with different phases from a plurality of light receiving elements, so that the phase shift attributed to interference by the index channel signal is equalized and the phase shift is thereby reduced. The influence of distortion generated when outputs of the light receiving elements are inverted is also reduced.

In the optical encoder of one embodiment, the output section has a logical operation section for receiving inputs of light receiving signals outputted by the first and the second light receiving elements among a plurality of the light receiving elements and outputting a result of logical operation of both the light receiving signals as an index channel signal, and wherein a combination of a light incident state and a light non-incident state of the first and second light receiving elements when the index pattern section passes through the predetermined position corresponding to at least either one of the first light receiving element and the second light receiving element is different from a combination of a light incident state and a light non-incident state of the first and second light receiving elements when the light-ON section or the light-OFF section passes through the predetermined position corresponding to the first and second light receiving elements.

In the optical encoder of this embodiment, logical operation of the light receiving signals outputted by the first and second light receiving elements can provide an index channel signal indicating the reference position of a moving object.

In the optical encoder of one embodiment, the light receiving section outputs a plurality of mutually-independent movement information signals (A+, A−, B+, B−) by the light receiving signals of the light receiving elements, is placed corresponding to a predetermined number of the light-ON sections, and has a number of the light receiving elements, the number of which is expressed as a product of a number of the mutually-independent movement information signals with a power of the number of the corresponding light-ON sections.

Since the optical encoder of this embodiment has a number of the light receiving elements, the number of which is expressed as a product of a number of the mutually-independent movement information signals with a power of the number of the corresponding light-ON sections, the light receiving elements are subdivided, and therefore, it becomes possible to reduce phase variation among the incremental signals due to the movement information signals.

In the optical encoder of one embodiment, a moving direction size of the index pattern section of the moving object is shorter than a moving direction size of the light-ON section and a moving direction size of the light-OFF section.

In the optical encoder of this embodiment, it becomes possible to reduce the infiltration of light from the index pattern section to the corresponding areas of the light-OFF section and the light-ON section which constitute the incremental pattern section. This makes it possible to reduce misreading of the index pattern section as well as to reduce phase variation of the incremental channel signals.

In the optical encoder of one embodiment, the moving object has index pattern side sections placed adjacent to both sides of the moving direction of the index pattern section for disabling the light beam from coming incident into the light receiving element when the pattern side sections pass through the predetermined position corresponding to the light receiving element, the two index pattern side sections placed adjacent to both sides of the moving direction of the index pattern section being symmetrical about the index pattern section, and the index pattern section enabling the light beam to come incident into the light receiving element when the index pattern passes through the predetermined position corresponding to the light receiving element.

In the optical encoder of this embodiment, the light from the index pattern section equally infiltrates the index pattern side sections on both the sides of the index pattern section, so that reduction of the infiltration of light is achieved symmetrically without deviation between the left-hand side and the right-hand side, and this can achieve most efficient reduction of the infiltration of light.

In the optical encoder of one embodiment, a product of an inverse number of a natural number-fold of a number of the light receiving elements corresponding to one light-ON section in the prescribed position with an array pitch of the light-ON sections is set as a moving direction size of the index pattern section.

In the optical encoder in this embodiment, assuming that the number of the light receiving elements corresponding to one light-ON section is, for example, 3, 4, 5, 6 . . . , the index pattern section has a moving direction size (width size) of ⅓n, ¼n, ⅕n and ⅙n times (n is a natural number) as long as an array-pitch P of the light-ON section. Therefore, since the number and the width size of the light receiving elements match with the width size of the index pattern section, it becomes relatively easy to generate an index channel signal through the logical operation with the signals acquired from the light receiving elements.

In the optical encoder of one embodiment, the light receiving section has a first light receiving element group composed of a number of adjacent light receiving elements, the number being proportionally corresponding to one light-OFF section of the moving object, and a second light receiving element group which is composed of a number of adjacent light receiving elements, the number being identical to that in the first light receiving element group and which is in a position corresponding to the light-OFF section of the moving object when the index pattern section and the index pattern side section of the moving object are in a position corresponding to the first light receiving element group, wherein when the light-OFF section of the moving object is in a position corresponding to the first light receiving element group, another light-OFF section or the index pattern section of the moving object is in a position corresponding to the second light receiving element group, and wherein the output section has a differential amplifier which receives inputs of a first added signal obtained by adding together a plurality of light receiving signals outputted by the first light receiving element group and a second added signal obtained by adding together a plurality of light receiving signals outputted by the second light receiving element group and which compares and calculates the first added signal and the second added signal.

In the optical encoder in this embodiment, when the index pattern section and the index pattern side sections of the moving object are in a position corresponding to the first light receiving element group, the light-OFF section of the moving object is in a position corresponding to the second light receiving element group. Therefore, the differential amplifier compares and calculates a first added signal obtained by adding together a plurality of light receiving signals outputted by a plurality of light receiving elements corresponding to the index pattern section and the index pattern side sections and a second added signal obtained by adding together a plurality of light receiving signals outputted by a plurality of light receiving elements corresponding to the light-OFF section, and as a result of the comparison and calculation, the differential amplifier outputs an index channel signal. The differential amplifier makes it possible to remove common mode noise and to suppress malfunction. Moreover, since the first and second added signals are formed by adding together the light receiving signals of a plurality of the light receiving elements, the light receiving area is widened, and so an SN value of signal can be enhanced.

When both the first light receiving element group and the second light receiving element group are in the position corresponding to the light-OFF section or the light-ON section, the first added signal and the second added signal become identical signals, as a result of which the differential amplifier does not output an index channel signal.

The optical encoder of one embodiment, comprises:

a first AND circuit for receiving inputs of a plurality of incremental channel signals with different phases; and a second AND circuit for receiving inputs of an AND signal outputted by the first AND circuit and an output signal of the differential amplifier.

In this embodiment, an index channel signal synchronized with an incremental channel signal by the movement information signal can be obtained from the second AND circuit. Therefore, the phase relation between the incremental channel signal and the index channel signal can be maintained, which facilitates design of circuits for processing encoder outputs in subsequent stages.

In the optical encoder of one embodiment, the index pattern section is adjacent to the incremental pattern section, which is composed of the light-ON section and light-OFF section, in a direction orthogonal to the moving direction of the moving object.

In the optical encoder of this embodiment, the incremental channel signal and the index channel signal are out of phase with each other when the index pattern section is placed orthogonal to the moving direction with respect to the incremental pattern section. Therefore, mutual interference between the index channel signal and the incremental channel signal can be suppressed, so that the phase shift and distortion of the incremental channel signal can be suppressed.

More specifically, even in the case where the index pattern section is placed in the area different from the incremental pattern section, then malfunction is likely to occur due to the influence of noise from the motor of an actuator or from a signal processing circuit if the incremental channel signal and the index channel signal share the same phase.

In this embodiment, the output section should preferably perform differential operation of the second light receiving signal and the first light receiving signal to output the index channel signal. Such differential operation is preferable for matching the index channel signal and the incremental channel signal.

In this embodiment, it becomes possible to keep the change in amount of light and phase fluctuation in the incremental pattern section from causing the waveform omission of the index channel signal, and to thereby suppress malfunction.

Moreover, since one index pattern section is generally present for one rotation of the moving object, a fixed amount of light can be received with the light receiving elements corresponding to the incremental pattern section except when the index pattern section passes through a predetermined position corresponding to the light receiving elements. Consequently, an offset is produced between the light receiving amount of the light receiving elements corresponding to the index pattern section and the light receiving amount of the light receiving elements corresponding to the incremental pattern section. Therefore, malfunction such as signal inversion caused by disturbance light and the like can be suppressed by taking a differential of the light receiving signals from both the light receiving elements.

In the optical encoder of one embodiment, a moving direction size of one pattern composed of a pair of the light-ON section and the light-OFF section which are adjacent to each other is identical to a moving direction size of the index pattern section, and wherein the light receiving section has a light receiving element which receives a light beam incident from the index pattern section and which has a moving direction size identical to the moving direction size of the index pattern section.

In this embodiment, the light receiving element with a moving direction size of 1 pitch can obtain an amount of light for two patterns (two cycles) of the incremental pattern section from the index pattern section. When the output section performs the differential operation of the first light receiving signal and the second light receiving signal, the index channel signal for one cycle can be obtained. Moreover, the index channel signal of one pulse can be generable by performing logical operation of the index channel signal and the incremental channel signal.

When the light receiving section includes a light receiving element which has a moving direction size of 1 pitch and receives light beams from the incremental pattern section, the light receiving element with the moving direction size of 1 pitch constantly receives a fixed amount of light from the incremental pattern section. Therefore, by using a differential output of a light receiving signal by the 1-pitch light receiving element which receives a light beam from the incremental pattern section and a light receiving signal by the 1-pitch light receiving element which receives a light beam from the index pattern section as the index channel signal, it becomes possible to suppress cycle variation of the index channel signals. Moreover, two light receiving elements for obtaining the index channel signal is set to have the identical width (moving direction size), so that the parasitic capacitance attributed to both the light receiving elements can be equalized and so the malfunction caused by power supply noise and the like can be suppressed.

In the optical encoder of one embodiment, the light receiving section has:

a first index light receiving element for receiving a light beam incident from the index pattern section; and a second index light receiving element which is adjacent to the first index light receiving element in the moving direction and which has a moving direction size identical to the moving direction size of the first index light receiving element, and wherein the output section outputs the index channel signal only when the first light receiving signal outputted by the first index light receiving element is larger than an incremental channel signal used as a reference, and the second light receiving signal outputted by the second index light receiving element is smaller than the incremental channel signal used as the reference.

In this embodiment, the output section outputs the index channel signal only when the first light receiving signal outputted by the first index light receiving element is larger than the incremental channel signal used as the reference and the second light receiving signal outputted by the second index light receiving element is smaller than the incremental channel signal used as the reference. This makes it possible to prevent misdetection of the index pattern section caused by the change in amount of light from the index pattern section and the like.

In the optical encoder of one embodiment, the output section outputs a composite signal composed of the incremental channel signal and the index channel signal, in which the incremental channel signal is present in one voltage range out of a first voltage range higher than a reference voltage and a second voltage range lower than the reference voltage, while the index channel signal is present in the other voltage range out of the two voltage ranges.

In this embodiment, by outputting a composite signal composed of the incremental channel signal and the index channel signal, it becomes possible to reduce the number of output signals and to thereby reduce mounting areas.

Electronic equipment of one embodiment comprises the optical encoder the above embodiment and the electronic equipment further comprises:

a first differential operation section which performs differential operation of the composite signal from the output section with a first voltage shifted from the reference voltage to the one voltage range and outputs an incremental channel signal; and a second differential operation section which performs differential operation of the composite signal from the output section with a second voltage shifted from the reference voltage to the other voltage range and outputs an index channel signal.

Since the electronic equipment of this embodiment has the first and second differential operation sections, the composite signal from the output section of the optical encoder can be used after being separated into an incremental channel signal and an index channel signal, so that processing in subsequent stages such as motor control becomes easy. Moreover, since the first and second differential operation sections perform differential operation with first and second voltages shifted from the reference voltage, the influence of offset becomes avoidable.

Since the electronic equipment of one embodiment has the optical encoder, movement information (incremental channel signal) and reference position information (index channel signal) can be acquired with sufficient precision at low cost.

According to the optical encoder of this invention, the index channel signal indicating the reference position of a moving object is out of phase with the incremental channel signal indicating the movement information of the moving object, so that mutual interference between the index channel signal and the incremental channel signal can be suppressed. Therefore, the phase shift and distortion of the incremental channel signal can be suppressed, and thereby the movement information and the reference position information can be acquired with sufficient precision at low cost.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6A is a schematic view showing an optical encoder in a third embodiment of the present invention;

FIG. 13A is a schematic view showing an optical encoder in a sixth embodiment of the present invention;

FIG. 13D is a view showing the configuration of the output section of the optical encoder in the eighth embodiment of the invention;

FIG. 18 is a waveform chart showing an output signal waveform of an optical encoder in a ninth embodiment of the invention;

DETAILED DESCRIPTION OF THE INVENTION

Hereinbelow, the present invention will be described in details in conjunction with the embodiments with reference to the drawings.

First Embodiment

Figure 1:
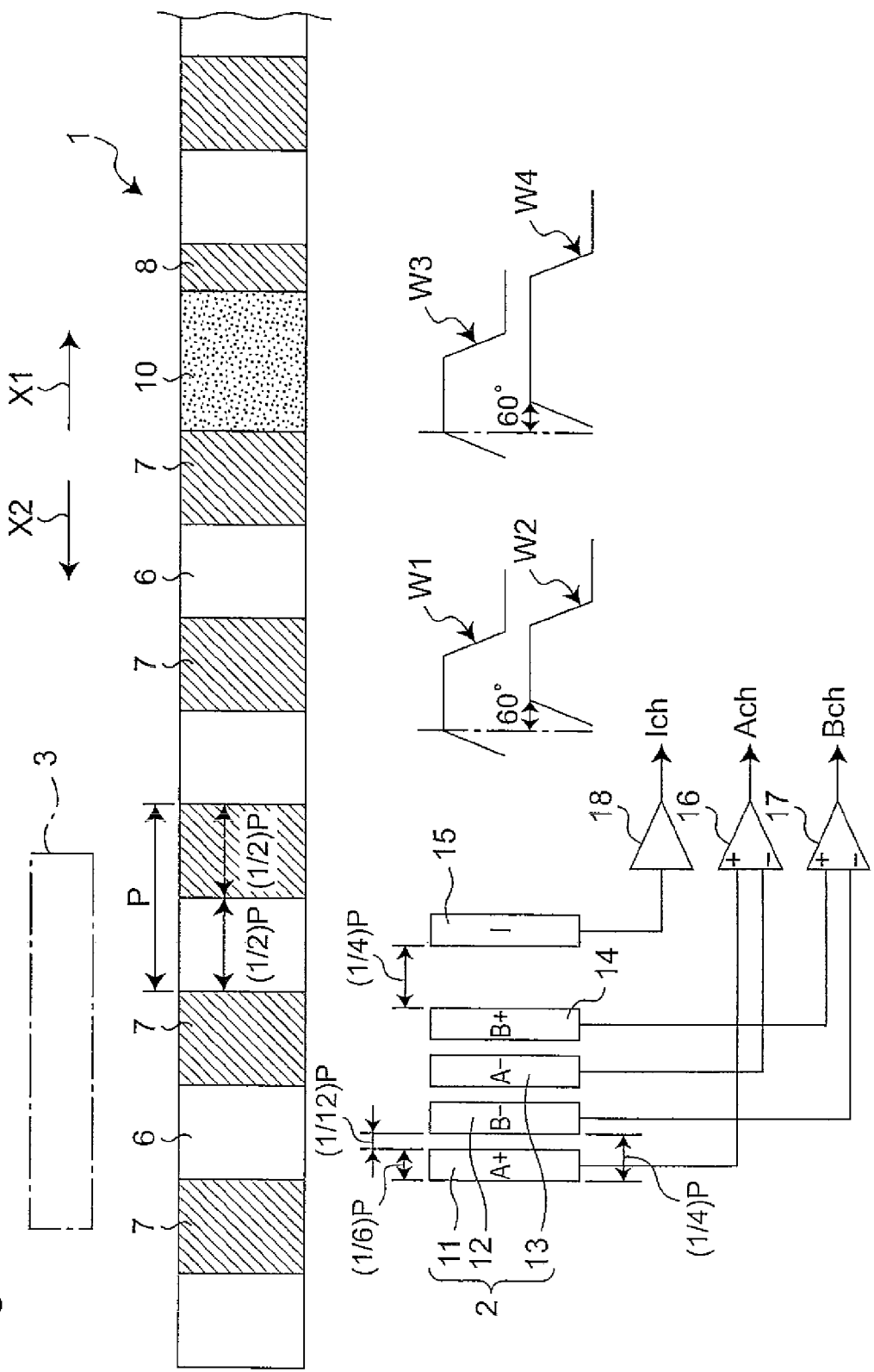
FIG. 1 is a schematic view showing an optical encoder in a first embodiment of the present invention.

FIG. 1 shows an optical encoder in a first embodiment of the invention. The first embodiment is composed of a moving object 1, a light receiving section 2, and a light emitting section 3. The light emitting section 3 is constituted of light emitting elements such as LEDs (Light Emitting diodes). The light receiving section 2 has five light receiving elements 11 to 15. The moving object 1 is movable in the direction shown by arrow X1 or X2, with a light-ON section 6 and a light-OFF section 7 being alternately arranged in the moving direction. The moving object 1 has an index pattern section 10 interposed in between the light-OFF section 7 and the light-OFF section 8 in the moving direction. The light-OFF section 8 has a moving direction size (width size) shorter than that of the light-OFF section 7. The light-ON section 6 and the index pattern section 10 pass the light beam from the light emitting section 3 to the light receiving section 2 side, whereas the light-OFF section 8 does not pass the light beam from the light emitting section 3 to the light receiving section 2 side. It is to be noted that the light receiving elements 11 to 15 are constituted of photodiodes.

In this embodiment, with the array pitch of the light-ON section 6 of the moving object 1 being set to P, the width size of each of the light receiving elements 11 to 15 is set to (1/6) P. Four light receiving elements 11 to 14 are placed at an interval of (1/12)P in the moving direction, and the light receiving elements 14 and 15 are placed at an interval of (1/4)P. It is to be noted that the width size of the light-ON section 6 and the light-OFF section 7 is set to (1/2)P.

Light receiving signals A+ and A− outputted by the light receiving elements 11 and 13 are inputted into a differential amplifier 16 via a current voltage conversion section (not shown), while light receiving signals B− and B+ outputted by the light receiving elements 12 and 14 are inputted into a differential amplifier 17 via the current voltage conversion section (not shown). A light receiving signal I outputted by the light receiving element 15 is inputted into an amplifier 18 via the current voltage conversion section (not shown). The differential amplifiers 16, 17, the amplifier 18, and the current voltage conversion section constitute an output section.

The differential amplifier 16 amplifies a difference between the light receiving signals A+ and A− and outputs an incremental channel signal A, while the differential amplifier 17 amplifies a difference between the light receiving signal B+ and B− and outputs an incremental channel signal B. The amplifier 18 amplifies the light receiving signal I to output an index channel signal ID.

FIG. 1 schematically shows a waveform W1 of the light receiving signal A+ outputted by the light receiving element 11 when the light-ON section 6 passes through the position corresponding to the light receiving element 11 and a waveform W2 of the light receiving signal I outputted by the light receiving element 15 when the light-ON section 6 passes through the position corresponding to the light receiving element 15. The waveform W1 and the waveform W2 are out of phase with each other by 60 degrees. FIG. 1 also schematically shows a waveform W3 of the light receiving signal A+ outputted by the light receiving element 11 when the index pattern section 10 passes through the position corresponding to the light receiving element 11 and a waveform W4 of the light receiving signal I outputted by the light receiving element 15 when the index pattern section 10 passes through the position corresponding to the light receiving element 15. The waveform W3 and the waveform W4 are out of phase with each other by 60 degrees.

Therefore, according to this embodiment, the incremental channel signal A indicating the movement information of the moving object 1 and the index channel signal ID indicating the reference position information of the moving object 1 are out of phase with each other. Moreover, though not shown in the waveform chart, the incremental channel signal B and the index channel signal ID are also out of phase with each other.

Therefore, according to this embodiment, even when the signal processing circuits of the output section are constituted from the same chip, mutual interference between the index channel signal ID and the incremental channel signals A, B can be suppressed. As a consequence, the phase shift and distortion of the incremental channel signal can be suppressed, so that malfunction such as, for example, chattering phenomenon and logic reversal can be avoided and thereby movement information and reference position information can be acquired with sufficient precision at low cost.

COMPARATIVE EXAMPLE 1

Figure 9:
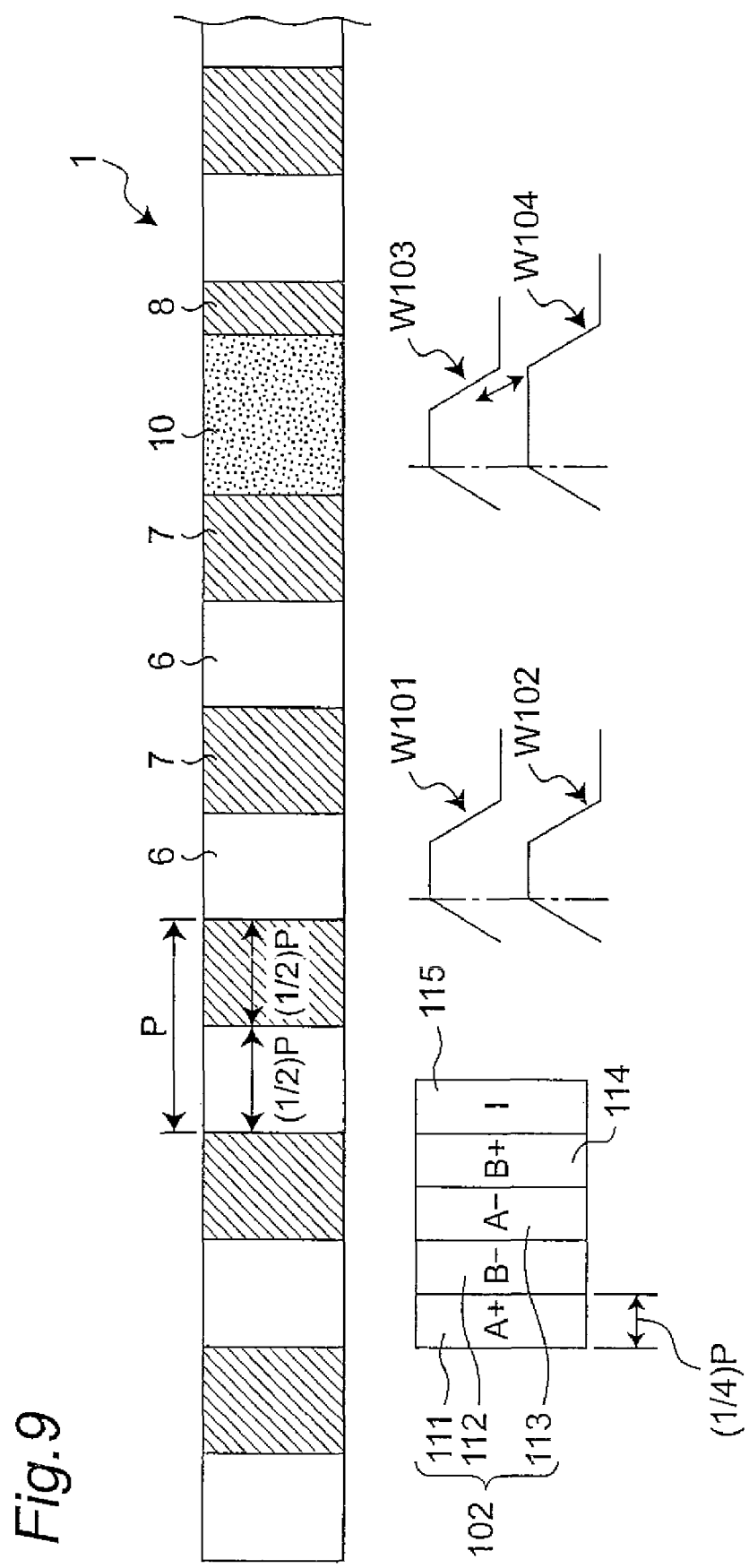
FIG. 9 is a schematic view showing a comparative example 1 of the first embodiment.

Description is now given of a comparative example 1 of the first embodiment with reference to FIG. 9. The comparative example 1 is different from the first embodiment only in the point that the light receiving section 2 of the first embodiment is replaced with a light receiving section 102. In the light receiving section 102 in the comparative example 1, the width size of respective light receiving elements 111 to 115 is set to (1/4)P. The interval between each light receiving element is set to zero. Accordingly, in the comparative example 1, a waveform W101 of a light receiving signal A+ outputted by the light receiving element 111 when a light-ON section 6 passes through the position corresponding to the light receiving element 111 is in phase with a waveform W102 of a light receiving signal I outputted by the light receiving element 115 when the light-ON section 6 passes through the position corresponding to the light receiving element 115. Moreover, a waveform W103 of a light receiving signal A+ outputted by the light receiving element 111 when an index pattern section 10 passes through the position corresponding to the light receiving element 111 is also in phase with a waveform W104 of a light receiving signal I outputted by the light receiving element 115 when the index pattern section 10 passes through the position corresponding to the light receiving element 115.

Therefore, in the comparative example 1, mutual interference between the index channel signal ID and the incremental channel signals A, B tends to occur. As a consequence, the phase shift and distortion of the incremental channel signal are easily generated, so that malfunction such as, for example, chattering phenomenon and logic reversal tend to occur.

Second Embodiment

Figure 2:
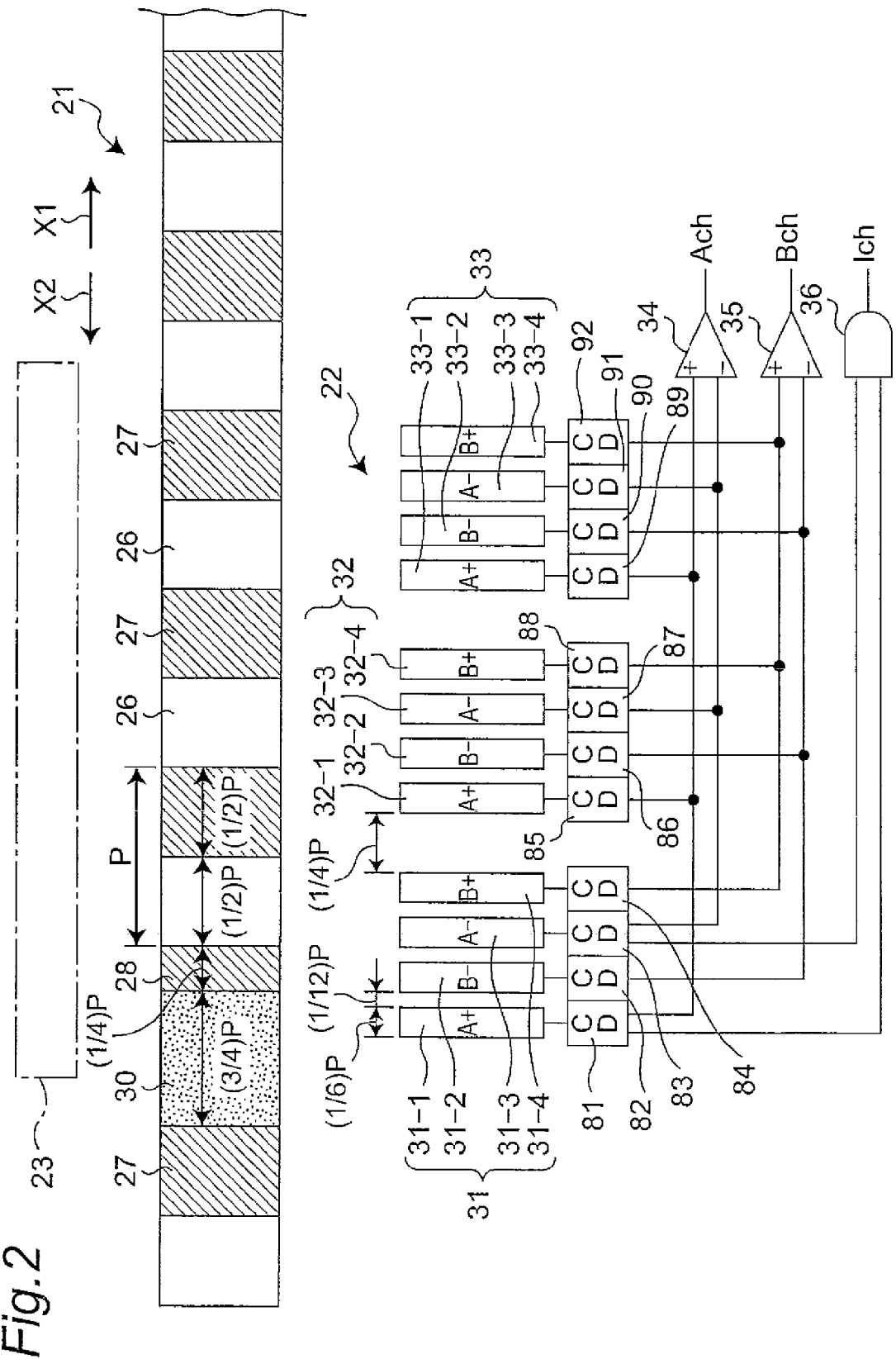
FIG. 2 is a schematic view showing an optical encoder in a second embodiment of the present invention.

FIG. 2 shows an optical encoder in a second embodiment of the invention. The second embodiment is composed of a moving object 21, a light receiving section 22, and a light emitting section 23. The moving object 21 is movable in the direction shown by arrow X1 or X2, with a light-ON section 26 and a light-OFF section 27 being alternately arranged in the moving direction. The moving object 21 has an index pattern section 30 interposed in between the light-OFF section 27 and the light-OFF section 28 in the moving direction. The light-OFF section 28 has a moving direction size (width size) shorter than that of the light-OFF section 27. The light-ON section 26 and the index pattern section 30 pass the light beam from the light emitting section 23 to the light receiving section 22 side, whereas the light-OFF section 28 does not pass the light beam from the light emitting section 23 to the light receiving section 22 side.

The light receiving section 22 has first, second, and third light receiving element groups 31, 32 and 33. The first light receiving element group 31 is composed of four light receiving elements 31-1, 31-2, 31-3, and 31-4. With an array pitch of the light-ON section 26 of the moving object 21 being set to P, the light receiving elements 31-1 to 31-4 have a width size of (⅙)P, respectively. The light receiving elements 31-1 to 31-4 are placed at an interval of (1/12)P in the moving direction. In short, the light receiving elements 31-1 to 31-4 are arranged with an array pitch of (¼)P. The second light receiving element group 32 is composed of four light receiving elements 32-1, 32-2, 32-3, and 32-4. The light receiving elements 32-1 to 32-4 have a width size of (⅙)P, respectively. The light receiving elements 32-1 to 32-4 are placed at an interval of (1/12)P in the moving direction.

The light receiving element 31-4 of the first light receiving element group 31 is away from the light receiving element 32-1 of the second light receiving element group 32 by a distance of (¼)P.

The third light receiving element group 33 is composed of four light receiving elements 33-1, 33-2, 33-3, and 33-4. The light receiving elements 33-1 to 33-4 have a width size of (⅙)P, respectively. The light receiving elements 33-1 to 33-4 are placed at an interval of (1/12)P in the moving direction. The light receiving element 32-4 of the second light receiving element group 32 is away from the light receiving element 33-1 of the third light receiving element group 33 by a distance of (¼)P.

The second embodiment has an output section composed of a first differential amplifier 34, a second differential amplifier 35 and an AND circuit 36. Three light receiving signals A+ with different phases outputted by the light receiving elements 31-1, 32-1, and 33-1 travel through current distributors 81, 85, and 89 where they are electrically added together, and are inputted into a non-inverting input terminal of the first differential amplifier 34 via a current voltage conversion section (not shown). Three light receiving signals A− with different phases outputted by the light receiving elements 31-3, 32-3, and 33-3 travel through current distributors 83, 87, and 91 where they are electrically added together, and are inputted into an inverting input terminal of the first differential amplifier 34 via the current voltage conversion section (not shown).

Three light receiving signals B+ with different phases outputted by the light receiving elements 31-4, 32-4, and 33-4 travel through current distributors 84, 88, and 92 where they are electrically added together, and are inputted into a non-inverting input terminal of the second differential amplifier 35 via the current voltage conversion section (not shown). Three light receiving signals B− with different phases outputted by the light receiving elements 31-2, 32-2, and 33-2 travel through current distributors 82, 86, and 90 where they are electrically added together, and are inputted into an inverting input terminal of the second differential amplifier 35 via the current voltage conversion section (not shown). It is to be noted that the current distributors 81-92 are constituted from, for example, current mirror circuits.

The light receiving signal A+ outputted by the light receiving element 31-1 and the light receiving signal A− outputted by the light receiving element 31-3 travel through the current distributors 81, 83 and an AD converting section (not shown) before being inputted into the AND circuit 36. The AND circuit 36 outputs a result of AND operation of the signals obtained by applying AD conversion on the light receiving signals A+ and A− as an index channel signal ID.

Thus, the index channel signal ID is generated from logical values obtained by logical operation of the outputs from a plurality of light receiving elements in which the correlation between an optical ON state and an optical OFF state is changed between at the time when the index pattern section 30 passes through the light receiving section 22 and at the time when the light-ON section 26 and the light-OFF section 27, which constitute an incremental pattern, pass through the light receiving section 22.

The first differential amplifier 34 amplifies a difference between a signal obtained by electrically adding together three light receiving signals A+ with different phases and a signal obtained by electrically adding together three light receiving signals A− with different phases to output an incremental channel signal A. The second differential amplifier 35 amplifies a difference between a signal obtained by electrically adding together three light receiving signals B+ with different phases and a signal obtained by electrically adding together three light receiving signals B− with different phases to output an incremental channel signal B.

Figure 3:
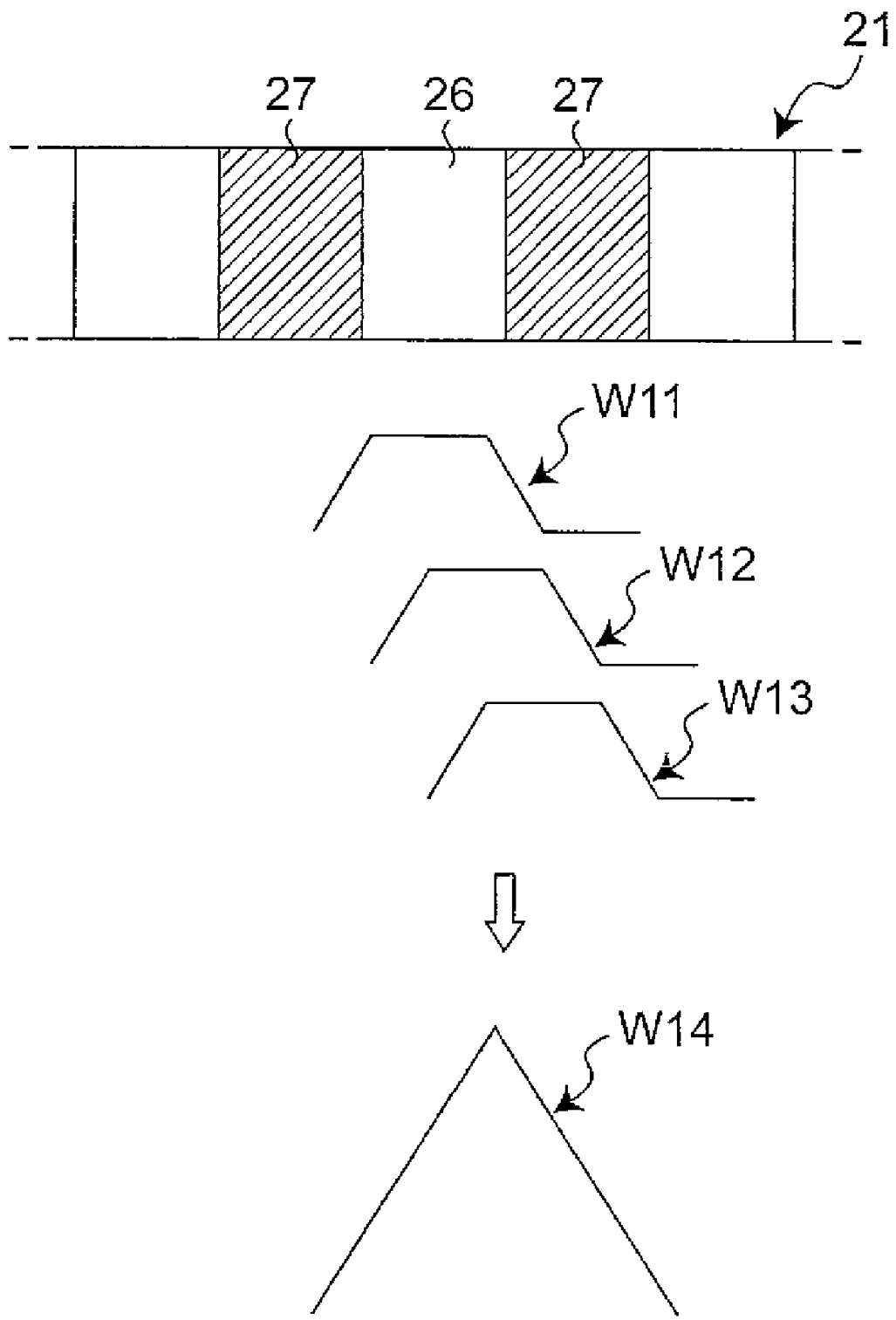
FIG. 3 is a waveform chart explaining addition processing of light receiving signals A+ when an incremental pattern passes in the second embodiment.

FIG. 3 schematically shows waveforms W11, W12 and W13 of the three light receiving signals A+ with different phases, which are outputted by the light receiving elements 31-1, 32-1 and 33-1 when the light-ON section 26 passes through the positions corresponding to the light receiving elements 31-1, 32-1 and 33-1. The signal waveform W14 shown in FIG. 3 is a waveform of the signal obtained by electrically adding together the light receiving signals A+ having three waveforms W11, W12, and W13 with different phases. The signal waveform W14 corresponds to the signal waveform of an incremental channel signal A provided when the light-ON section 26 and the light-OFF section 27 pass the light receiving section 22 though the index pattern section 30 does not pass the light receiving section 22.

Figure 4:
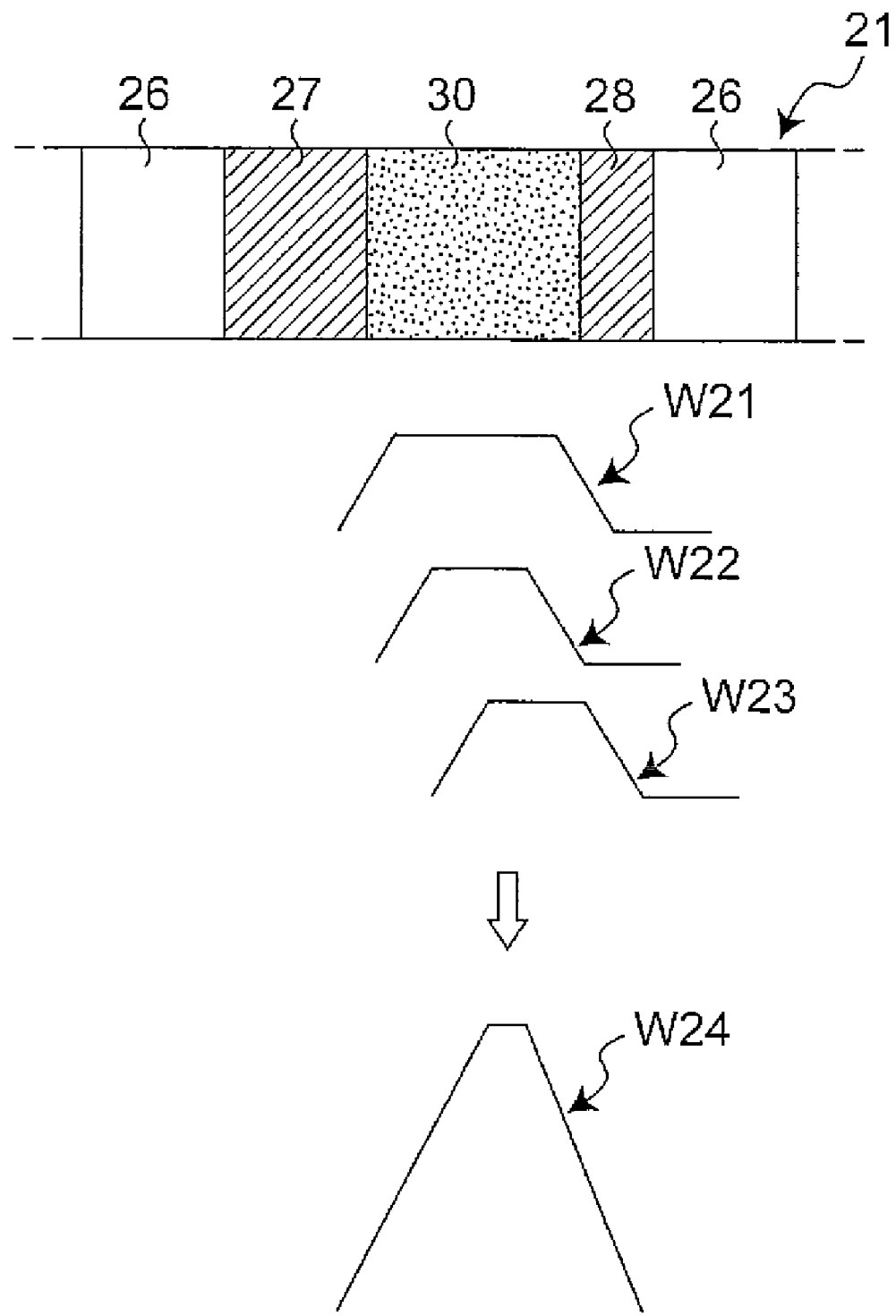
FIG. 4 is a waveform chart explaining addition processing of light receiving signals A+ when an index pattern passes in the second embodiment.

FIG. 4 schematically shows a waveform W21 of a light receiving signal A+ outputted by the light receiving element 31-1 when the index pattern section 30 passes through the position corresponding to the light receiving element 31-1, and waveforms W22 and W23 of the light receiving signals A+ outputted by the light receiving elements 32-1 and 33-1 when the light-ON section 26 passes through the positions corresponding to the light receiving elements 32-1 and 33-1.

The signal waveform W24 shown in FIG. 4 is a waveform of the signal obtained by electrically adding together the light receiving signals A+ having three waveforms W21, W22, and W23 with different phases. The signal waveform W24 corresponds to the signal waveform of an incremental channel signal A provided when the light-ON section 26, the light-OFF section 27 and the index pattern section 30 pass the light receiving section 22.

Figure 5:
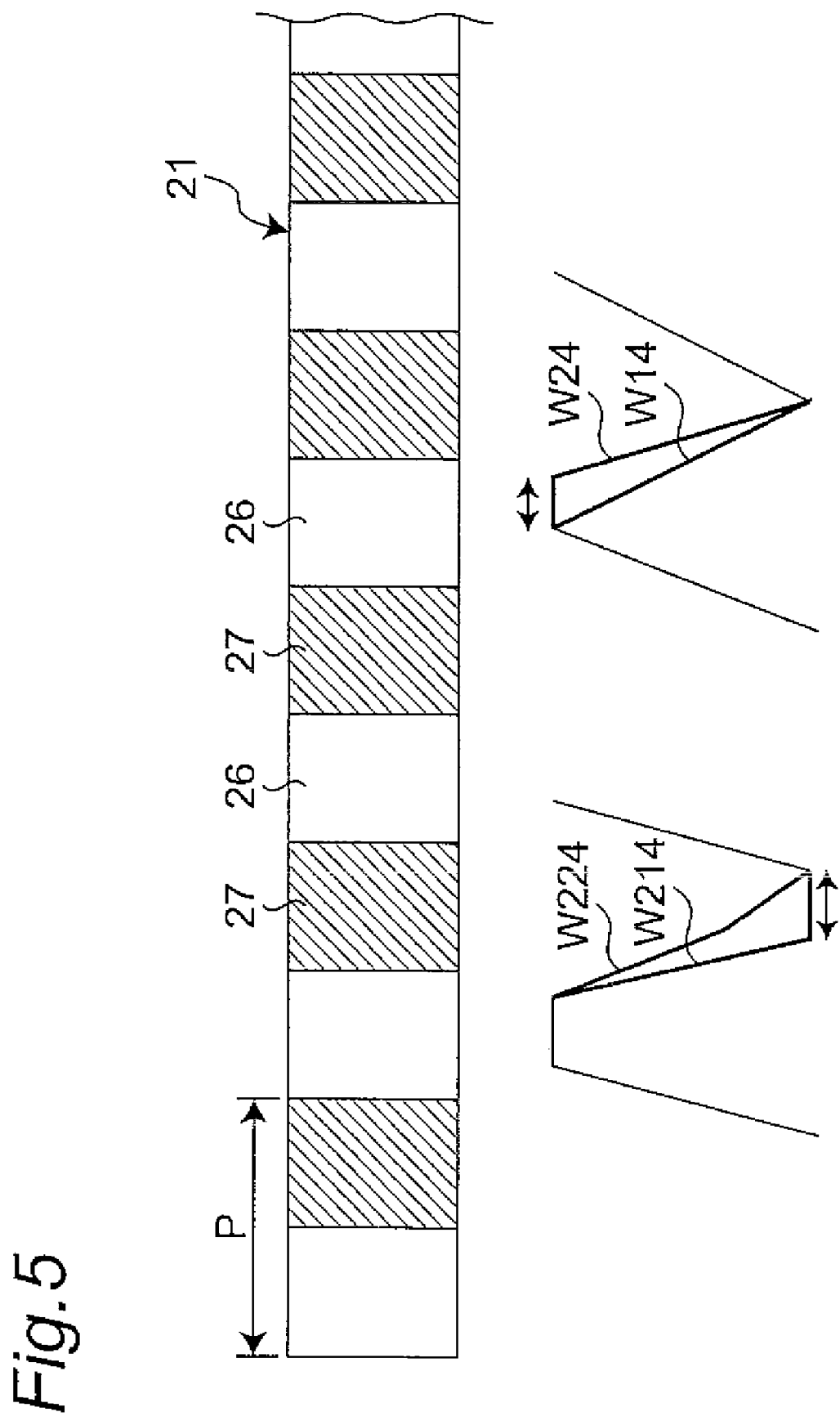
FIG. 5 is a waveform chart showing waveforms W14 and W214 after addition processing of the light receiving signals A+ when the incremental pattern passes and waveforms W24 and W224 after addition processing of the light receiving signals A+ when the index pattern passes in the second embodiment and the comparative example 2.

FIG. 5 shows a signal waveform W24 of an added light receiving signal A+ when the index pattern section 30, the light-ON section 26 and the light-OFF section 27 pass the light receiving section 22, and a signal waveform W14 of an added light receiving signal A+ when the light-ON section 26 and the light-OFF section 27 pass the light receiving section 22 though the index pattern section 30 does not pass the light receiving section 22.

COMPARATIVE EXAMPLE 2

Figure 10:
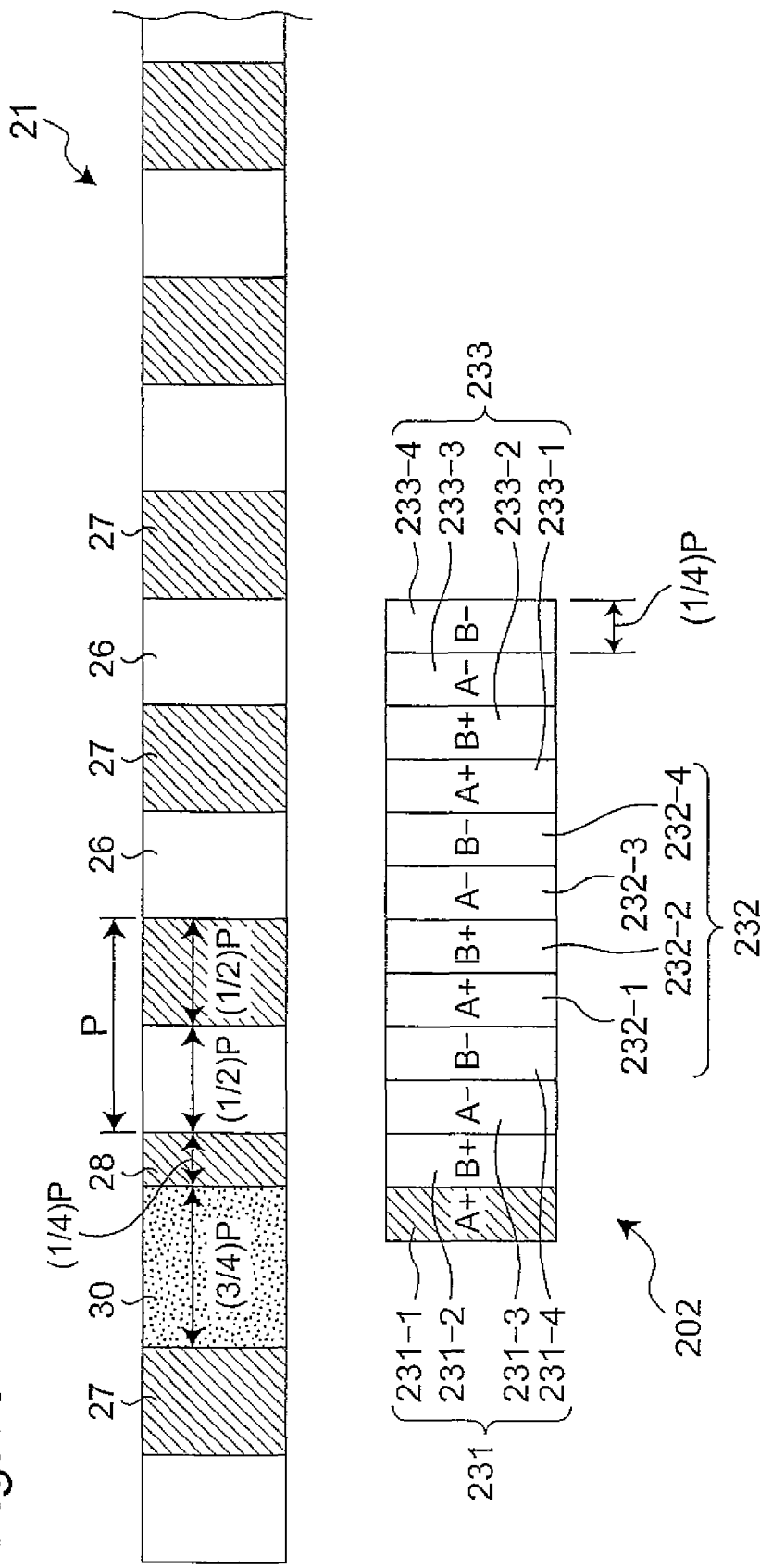
FIG. 10 is a schematic view showing a comparative example 2 of the second embodiment.

Description is now given of a comparative example 2 of the second embodiment with reference to FIG. 10. The comparative example 2 is different from the second embodiment only in the point that the light receiving section 22 of the second embodiment is replaced with a light receiving section 202. The light receiving section 202 has three light receiving element groups, first, second, and third light receiving element groups 231, 232 and 233. The first light receiving element group 231 is composed of four light receiving elements 231-1 to 231-4 with a width size of (¼)P, the second light receiving element group 232 is composed of four light receiving elements 232-1 to 232-4 with a width size of (¼)P, and the third light receiving element group 233 is composed of four light receiving elements 233-1 to 233-4 with a width size of (¼)P. The light receiving elements are each arranged so as to be aligned in the moving direction, and the interval between each light receiving element is set to zero.

In the comparative example 2, three light receiving signals A+ with different phases outputted by the light receiving elements 231-1, 232-1, and 233-1 are electrically added together, and are inputted into a non-inverting input terminal of a first differential amplifier 34 via a current voltage conversion section (not shown). Three light receiving signals A− with different phases outputted by the light receiving elements 231-3, 232-3, and 233-3 are electrically added together, and are inputted into an inverting input terminal of the first differential amplifier 34 via the current voltage conversion section (not shown).

Three light receiving signals B− with different phases outputted by the light receiving elements 231-4, 232-4, and 233-4 are electrically added together, and are inputted into an inverting input terminal of a second differential amplifier 35 via the current voltage conversion section (not shown). Three light receiving signals B+ with different phases outputted by the light receiving elements 231-2, 232-2, and 233-2 are electrically added together, and are inputted into a non-inverting input terminal of the second differential amplifier 35 via the current voltage conversion section (not shown).

The light receiving signal A+ outputted by the light receiving element 231-1 and the light receiving signal A− outputted by the light receiving element 231-3 are inputted into an AND circuit 36 via an AD converting section (not shown). The AND circuit 36 outputs a result of AND operation of the signals obtained by applying AD conversion to the light receiving signals A+ and A− as an index channel signal ID.

Figure 11:
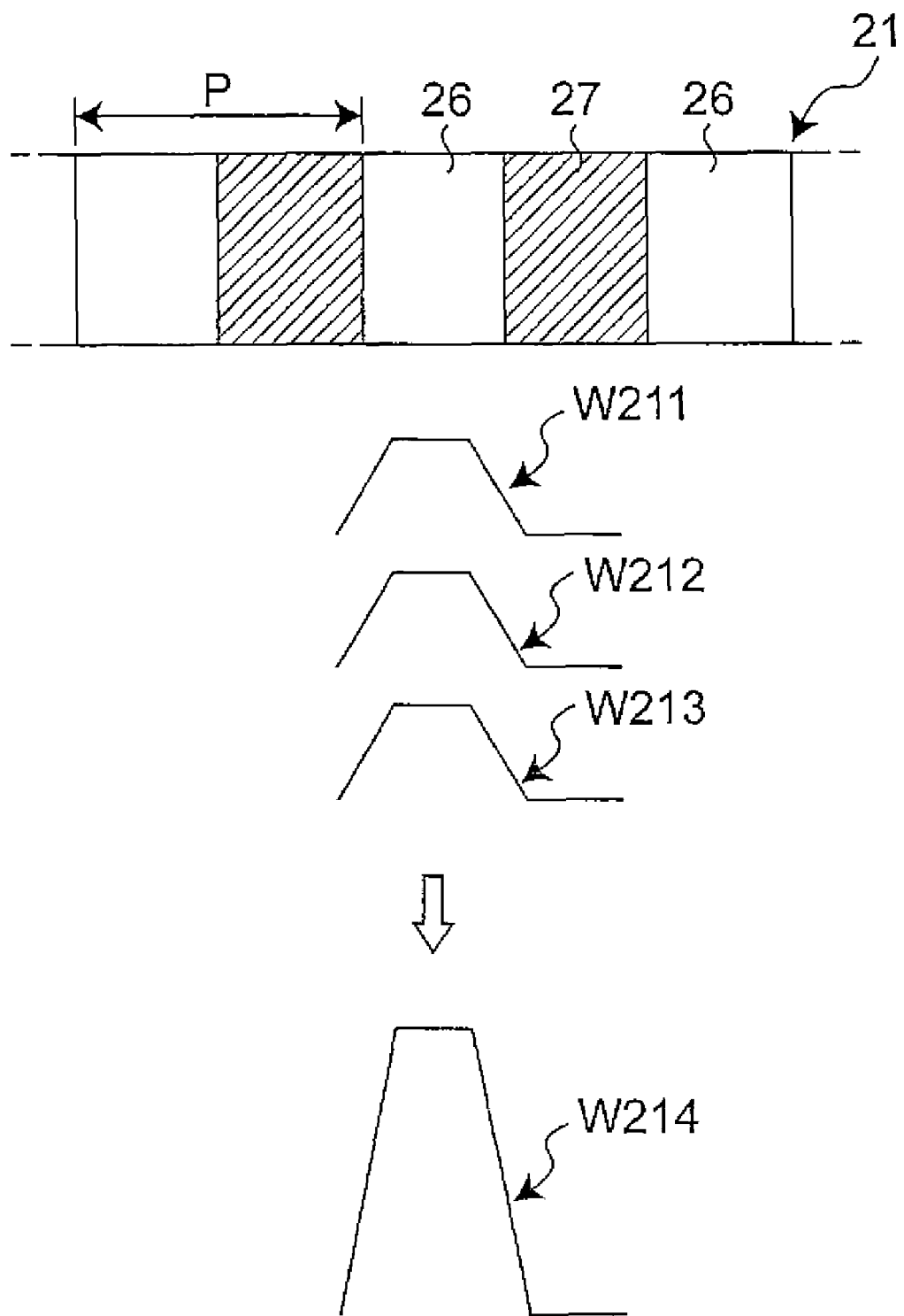
FIG. 11 is a waveform chart explaining addition processing of light receiving signals A+ when an incremental pattern passes in the comparative example 2.

FIG. 11 schematically shows waveforms W211, W212 and W213 of three light receiving signals A+ with an identical phase outputted by the light receiving elements 231-1, 232-1 and 233-1 when the light-ON section 26 passes through the positions corresponding to the light receiving elements 231-1, 232-1 and 233-1. A signal waveform W214 shown in FIG. 11 is a waveform of the signal obtained by electrically adding together the light receiving signals A+ having three waveforms W211, W212 and W213 with an identical phase.

Figure 12:
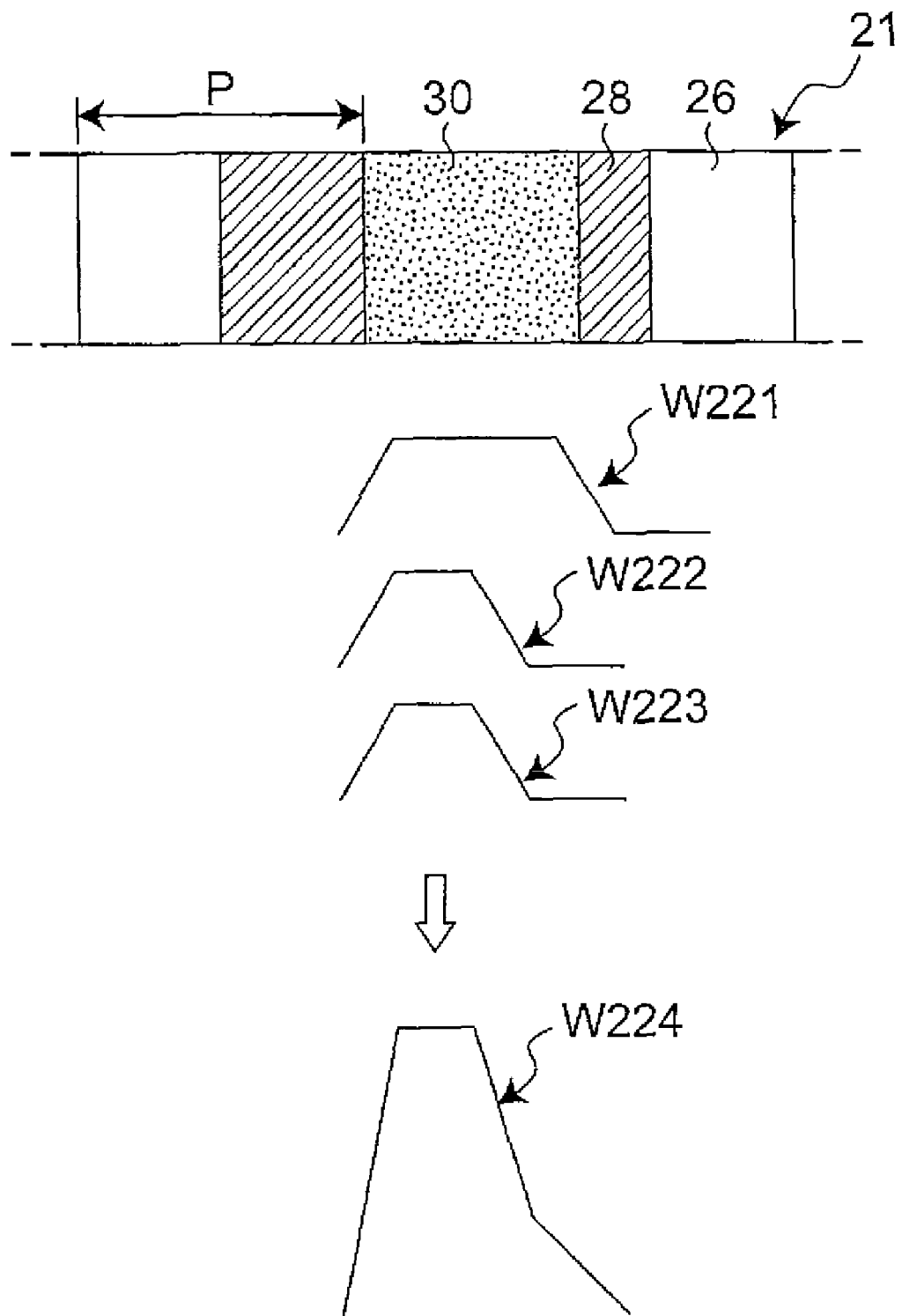
FIG. 12 is a waveform chart explaining addition processing of light receiving signals A+ when an index pattern passes in the comparative example 2.

FIG. 12 schematically shows a waveform W221 of a light receiving signal A+ outputted by the light receiving element 231-1 when the index pattern section 30 passes through the position corresponding to the light receiving element 231-1, and waveforms W222 and W223 of the light receiving signals A+ outputted by the light receiving elements 232-1 and 233-1 when the light-ON section 26 passes through the positions corresponding to the light receiving elements 232-1 and 233-1. A signal waveform W224 shown in FIG. 12 is a waveform of the signal obtained by electrically adding together the light receiving signals A+ having three waveforms W221, W222 and W223.

FIG. 5 shows a signal waveform W224 of an added light receiving signal A+ when the index pattern section 30, the light-ON section 26 and the light-OFF section 27 pass the light receiving section 202, and a signal waveform W214 of an added light receiving signal A+ when the light-ON section 26 and the light-OFF section 27 pass the light receiving section 202 though the index pattern section 30 does not pass the light receiving section 202.

In the comparative example 2, the light receiving signals A+ with an identical phase are added together to generate an incremental channel signal A. Therefore, as shown in FIG. 5, the signal waveform W224 of the signals added together when the index pattern section 30 passes has a waveform range which is wider, by the width of the index pattern section 30, than the signal waveform W214 of the signals added when the index pattern section 30 does not pass.

Contrary to this, in the second embodiment, the light receiving signals A+ with different phases are added together so as to make a signal to generate an incremental channel signal A, and therefore as shown in FIG. 5, the signal waveform W24 of the signals added at the time when the index pattern section 30 passes does not have a waveform range wider than the signal waveform W14 of the signals added at the time when the index pattern section 30 does not pass, so that the distortion of the waveform from the signal waveform W14 is suppressed.

Therefore, according to the second embodiment, even with the presence of the index pattern section, the incremental channel signal with little phase shift and distortion can be obtained.

Third Embodiment

Figure 6B:
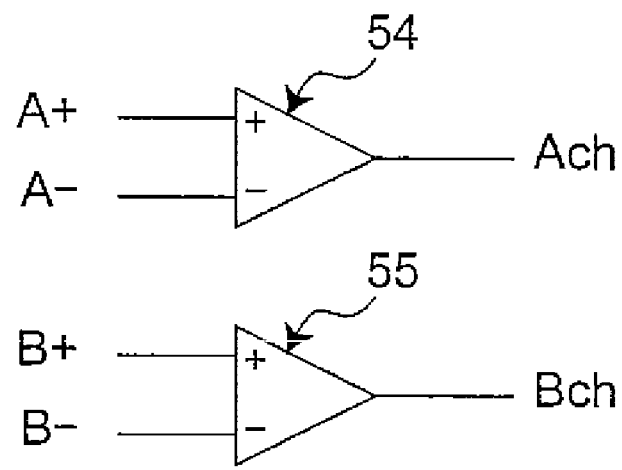
FIG. 6B is a view showing first and second differential amplifiers 54 and 55 included in an output section in the third embodiment.
Figure 6C:
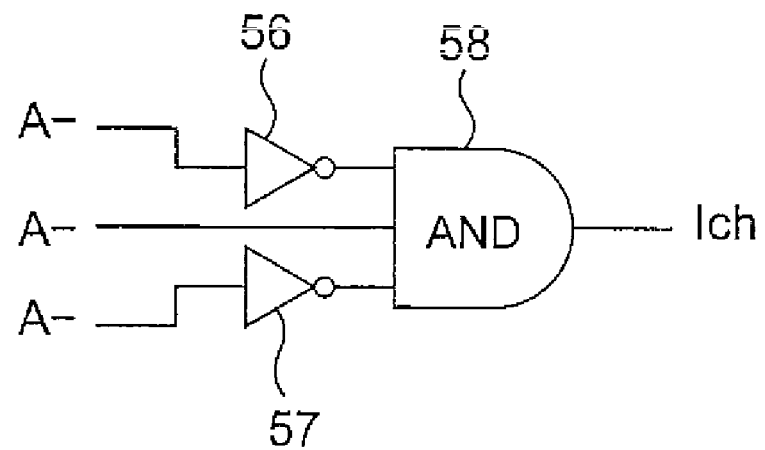
FIG. 6C is a view showing inverters 56, 57, and an AND circuit 58 included in the output section of the third embodiment.

Description is now given of an optical encoder in a third embodiment of the invention with reference to FIG. 6A to FIG. 6C.

The third embodiment is composed of a moving object 41, a light receiving section 42, and a light emitting section (not shown). This light emitting section is constituted of an LED and the like. The moving object 41 is movable in the direction shown by arrow X1 or X2, with a light-ON section 46 and a light-OFF section 47 being alternately arranged in the moving direction. Moreover, the moving object 41 has an index pattern section 50, which is interposed in between index pattern side sections 44 and 49 in the moving direction. These index pattern side sections 44 and 49 do not pass the light beam from the light emitting section to the light receiving section 42 side, whereas the index pattern section 50 passes the light beam from the light emitting section to the light receiving section 42 side. The light-ON section 46 passes the light beam from the light emitting section to the light receiving section 42 side, whereas the light-OFF section 47 does not pass the light beam from the light emitting section to the light receiving section 42 side.

The index pattern section 50 and the index pattern side sections 44, 49 respectively have a width size that is ⅓ the moving direction size (width size) of the light-OFF section 47, i.e., a width size of (⅙)P.

The light receiving section 42 has three light receiving element groups, first to third light receiving element groups 51 to 53. The first light receiving element group 51 is composed of 12 light receiving elements 51-1 to 51-12. With an array pitch of the light-ON section 46 of the moving object 41 being set to P, the light receiving elements 51-1 to 51-12 have a width size of (1/18)P, respectively. The light receiving elements 51-1 to 51-12 are arranged at an interval of (1/36)P in the moving direction. It is to be noted that the width size of the light-ON section 46 and the light-OFF section 47 is set to (½)P.

The second light receiving element group 52 is composed of 12 light receiving elements 52-1 to 52-12 with a width size of (1/18)P. The light receiving elements 52-1 to 52-12 are arranged at an interval of (1/36)P in the moving direction. The third light receiving element group 53 is composed of 12 light receiving elements 53-1 to 53-12 with a width size of (1/18)P. The light receiving elements 53-1 to 53-12 are arranged at an interval of (1/36)P in the moving direction.

The light receiving element 51-12 of the first light receiving element group 51 is away from the light receiving element 52-1 of the second light receiving element group 52 by a distance of (1/12)P. The light receiving element 52-12 of the second light receiving element group 52 is away from the light receiving element 53-1 of the third light receiving element group 53 by a distance of (1/12)P.

The third embodiment has an output section composed of a first differential amplifier 54 and a second differential amplifier 55 shown in FIG. 6B, and inverters 56, 57 and an AND circuit 58 shown in FIG. 6C.

Nine light receiving signals A+ with different phases outputted by the light receiving elements 51-1, 51-3, 51-5, the light receiving elements 52-1, 52-3, 52-5, and the light receiving elements 53-1, 53-3, 53-5 are electrically added together, and are inputted into a non-inverting input terminal of the first differential amplifier 54 shown in FIG. 6B via a current voltage conversion section (not shown). Nine light receiving signals A− with different phases outputted by the light receiving elements 51-7, 51-9, 51-11, the light receiving elements 52-7, 52-9, 52-11, and the light receiving elements 53-7, 53-9, 53-11 are electrically added together, and are inputted into an inverting input terminal of the first differential amplifier 54 via the current voltage conversion section (not shown) An output signal of the first differential amplifier 54 makes an incremental channel signal A.

Nine light receiving signals B+ with different phases outputted by the light receiving elements 51-2, 51-10, 51-12, the light receiving elements 52-2, 52-10, 52-12, and the light receiving elements 53-2, 53-10, 53-12 are electrically added together, and are inputted into a non-inverting input terminal of the second differential amplifier 55 shown in FIG. 6B via the current voltage conversion section (not shown). Nine light receiving signals B− with different phases outputted by the light receiving elements 51-4, 51-6, 51-8, the light receiving elements 52-4, 52-6, 52-8, and the light receiving elements 53-4, 53-6, 53-8 are electrically added together, and are inputted into an inverting input terminal of the second differential amplifier 55 via the current voltage conversion section (not shown). An output signal of the second differential amplifier 55 makes an incremental channel signal B.

Thus, the incremental channel signals A, B are each generated from a plurality of light receiving signals with different phases outputted by the light receiving elements 51-1 to 53-12 with subdivided width sizes, which makes it possible to suppress the phase shift of the incremental channel signals attributed to the index pattern section 50 being interposed in between the light-ON section 46 and the light-OFF section 47 of the moving object 41.

The light receiving signal A− outputted by the light receiving element 51-7 travels through an AD converting section (not shown) and an inverter 56 shown in FIG. 6C before being inputted into the AND circuit 58. The light receiving signal A− outputted by the light receiving element 51-11 travels through the AD converting section (not shown) and an inverter 57 shown in FIG. 6C before being inputted into the AND circuit 58. The light receiving signal A− outputted by the light receiving element 51-9 travels through the AD converting section (not shown) before being inputted into the AND circuit 58.

In the AND circuit 58, when, among three light receiving signal A− with a phase shifted by 60 degrees, the light receiving signal A− inputted into the AND circuit 58 without going through the inverter is a true value and the light receiving signals A− inputted into the inverters 56, 57 are false values, then the three signals inputted into the AND circuit 58 all end up as true values. Therefore, the output of the AND circuit 58 in this case is a true value, and so the AND circuit 58 outputs an index channel signal ID indicating that the index pattern section 50 passes through the portions corresponding to the three light receiving elements 51-7, 51-9, and 51-11. When the three light receiving elements 51-7, 51-9, and 51-11 are all in the positions corresponding to the light-ON section 46 or the light-OFF section 47, then the output of the AND circuit 58 ends up as a false value, and so an index channel signal ID is not outputted.

As described above, in the third embodiment, the light receiving section 42 is composed of 36 light receiving elements 51-1 to 53-12 with a width size subdivided into (⅛)P as shown in FIG. 6A, and therefore even if the width (⅙)P of the index pattern section 50 is small, the index channel signal ID can be obtained with the subdivided light receiving elements of the light receiving section 42. In the third embodiment, since the width size of the index pattern section 50 is smaller than the width size of the light-ON section 46, that is, ⅓ the width size of the light-ON section 46, the infiltration of light from the index pattern section 50 is little enough to avoid malfunction of the logical value calculation by the logic operation circuit attributed to the infiltration of light, so that a correct index channel signal ID can be generated. It is to be noted that the width size of the index pattern section 50 may be a value less than (⅙)P or conversely a value more than (⅙)P.

In the third embodiment, since the index pattern section 50 is positioned between the index pattern side sections 44 and 49 with an identical width of (⅙)P, the infiltration of light from the index pattern section 50 to the light receiving elements facing the index pattern side sections 44, 49 is equalized between the index pattern side sections 44 and 49. Therefore, it becomes possible to sufficiently suppress the filtration of light.

In the third embodiment, a product (⅙)P of an inverse number (⅙) of 6 that is 1 (natural number)-fold of 6, the number of the light receiving elements corresponding to one light-ON section 46, with an array-pitch P of the light-ON section 46 is set as the moving direction size of the index pattern section 50. Therefore, the width size of one light receiving element is (1/18)P with respect to the width size (1/6)P of the index pattern section 50, so that it becomes relatively easy to generate an index channel signal from the logical operation of the signals obtained from the light receiving elements which face the index pattern section 50 and from the light receiving elements which face the index pattern side sections 44, 49.

In the third embodiment, the light receiving section 42, which outputs four movement information signals A+, A−, B+, B−, are placed corresponding to three light-ON sections 46 and has 36 light receiving elements, which is a product of 6, the number of the movement information signals A+, A−, B+, B−, with a square of 3, the number of the light-ON sections 46. However, the number of the light receiving elements may be (4×3$^n$), that is a product of 4, the number of the movement information signals A+, A−, B+, B−, with n-th (n is a natural number) power of 3, the number of the light-ON sections 46. In the third embodiment, although the number of the light receiving elements corresponding to one light-ON section 46 is set to 6, the number may be any plural number other than 6. Moreover, a product (1/6n)P of an inverse number (1/6n) of 6n, that is, n-fold (n=natural number such as 2, 3, 4 . . . ) of 6, the number of light receiving elements corresponding to one light-ON section 46, with an array-pitch P of the light-ON section 46 may be set as the moving direction size of the index pattern section 50.

Fourth Embodiment

Figure 7:
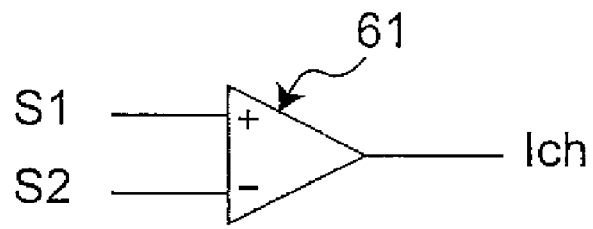
FIG. 7 is a view showing a differential amplifier as an output section included in an optical encoder of in a fourth embodiment of the invention.

Description is now given of an optical encoder in a fourth embodiment of the invention with reference to FIG. 7. The fourth embodiment is different from the above-mentioned third embodiment in the point that the output section composed of the inverters 56, 57 and the AND circuit 58 shown in FIG. 6C in the above-mentioned third embodiment is replaced with an output section constituted of a differential amplifier 61 shown in FIG. 7. Therefore, in the fourth embodiment, the components similar to those in the above-mentioned third embodiment are designated by the reference numerals similar to those of the above-mentioned third embodiment, and description is mainly focused on the point different from the above-mentioned third embodiment.

In the fourth embodiment, a first added signal S1 obtained by electrically adding together six light receiving signals A−, B−, A−, B+, A−, B+ outputted by six light receiving elements 51-7 to 51-12 in a first light receiving element group 51 included in a light receiving section 42 shown in FIG. 6A are inputted into a non-inverting input terminal of the differential amplifier 61 shown in FIG. 7 via a current voltage conversion section (not shown). A second added signal S2 obtained by electrically adding six light receiving signals B−, A−, B−, A−, B+, A− outputted by six light receiving elements 53-6 to 53-11 in a third light receiving element group 53 included in the light receiving section 42 are inputted into an inverting input terminal of the differential amplifier 61 shown in FIG. 7 via the current voltage conversion section (not shown).

Accordingly, in the fourth embodiment, when an index pattern section 50 and index pattern side sections 44, 49 of a moving object 41 are in the positions corresponding to six light receiving element 51-7 to 51-12 in the first light receiving element group 51, a light-OFF section 47 of the moving object 41 is in the positions corresponding to six light receiving elements 53-6 to 53-11 in the third light receiving element group 53.

Therefore, the differential amplifier 61 compares and calculates a first added signal S1 obtained by electrically adding together six light receiving signals A−, B−, A−, B+, A−, B+ outputted by six light receiving elements 51-7 to 51-12 corresponding to the index pattern section 50 and the index pattern side sections 44, 49 and a second added signal S2 obtained by electrically adding together six light receiving signals B−, A−, B−, A−, B+, A− outputted by six light receiving elements 53-6 to 53-11 corresponding to the light-OFF section 47, and as a result of the comparison and calculation, the differential amplifier 61 outputs an index channel signal ID. The differential amplifier 61 makes it possible to remove common mode noise and to suppress malfunction. Moreover, since the first and second added signals S1, S2 are each formed by adding together the light receiving signals of six light receiving elements, the light receiving area is widened, and so SN values of the signals S1, S2 can be enhanced. Moreover, in the fourth embodiment, as in the case of the above-mentioned third embodiment, malfunction attributed to the infiltration of light from the index pattern section 50 can be avoided so that a correct index channel signal ID can be generated.

It is to be noted that when both the six light receiving elements 51-7 to 51-12 of the first light receiving element group 51 and the six light receiving element 53-6 to 53-11 of the third light receiving element group 53 are in the position corresponding to the light-OFF section 47 or the light-ON section 46, the first added signal S1 and the second added signal S2 turn into the same signal, so that potential fluctuation does not occur upon their input into the differential amplifier and so the differential amplifier 61 does not output an index channel signal. It is to be noted that a hysteresis characteristic should preferably be provided to the index channel signal for suppression of malfunction.

Fifth Embodiment

Figure 8:
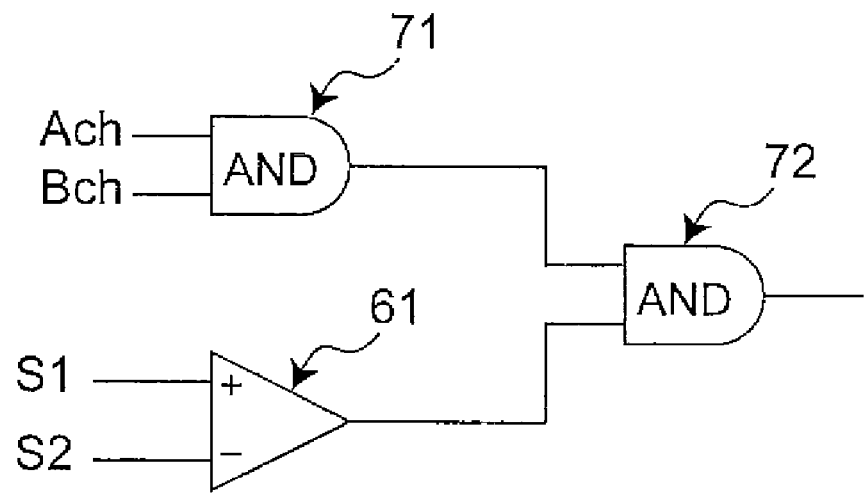
FIG. 8 is a view showing the configuration of an output section included in an optical encoder in a fifth embodiment of the invention.

Description is now given of an optical encoder in a fifth embodiment of the invention with reference to FIG. 8. The fifth embodiment is different from the above-mentioned fourth embodiment in the point that the output section has first and second AND circuits 71, 72 in addition to the differential amplifier 61 of the above-mentioned fourth embodiment. Therefore, in the fifth embodiment, the components similar to those in the above-mentioned fourth embodiment are designated by the reference numerals similar to those of the above-mentioned fourth embodiment, and description is mainly focused on the point different from the above-mentioned fourth embodiment.

In the fifth embodiment, an incremental channel signal A outputted by the first differential amplifier 54 shown in FIG. 6B in the above-mentioned third embodiment and an incremental channel signal B outputted by the second differential amplifier 55 are inputted into the first AND circuit 71. The first AND circuit 71 inputs an AND signal constituted of a logical product of the incremental channel signal A and the incremental channel signal B into the second AND circuit 72. The differential amplifier 61 receives inputs of first, second added signals S1, S2 similar to those in the above-mentioned fourth embodiment, and the differential amplifier 61 inputs an index channel signal ID identical to that in the above-mentioned fourth embodiment into the second AND circuit 72.

The second AND circuit 72 outputs a logical product between the logical product of the incremental channel signals A, B with a phase difference by 90 degrees and the index channel signal ID as a new index channel signal which is in synchronization with the incremental channel signal.

In addition, in electronic equipment including the optical encoder according to any one of the first to fifth embodiments, movement information (incremental channel signal) and reference position information (index channel signal) can be acquired with sufficient precision at low cost.

Sixth Embodiment

Figure 13B:
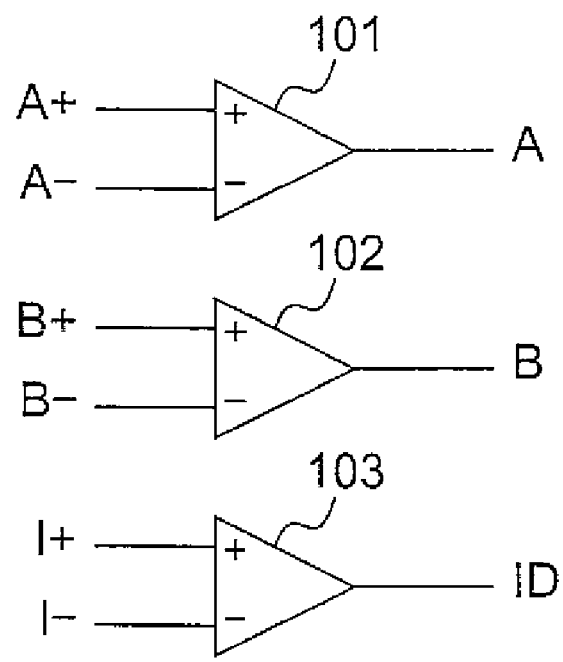
FIG. 13B is a view showing the configuration of an output section in the sixth embodiment.
Figure 14:
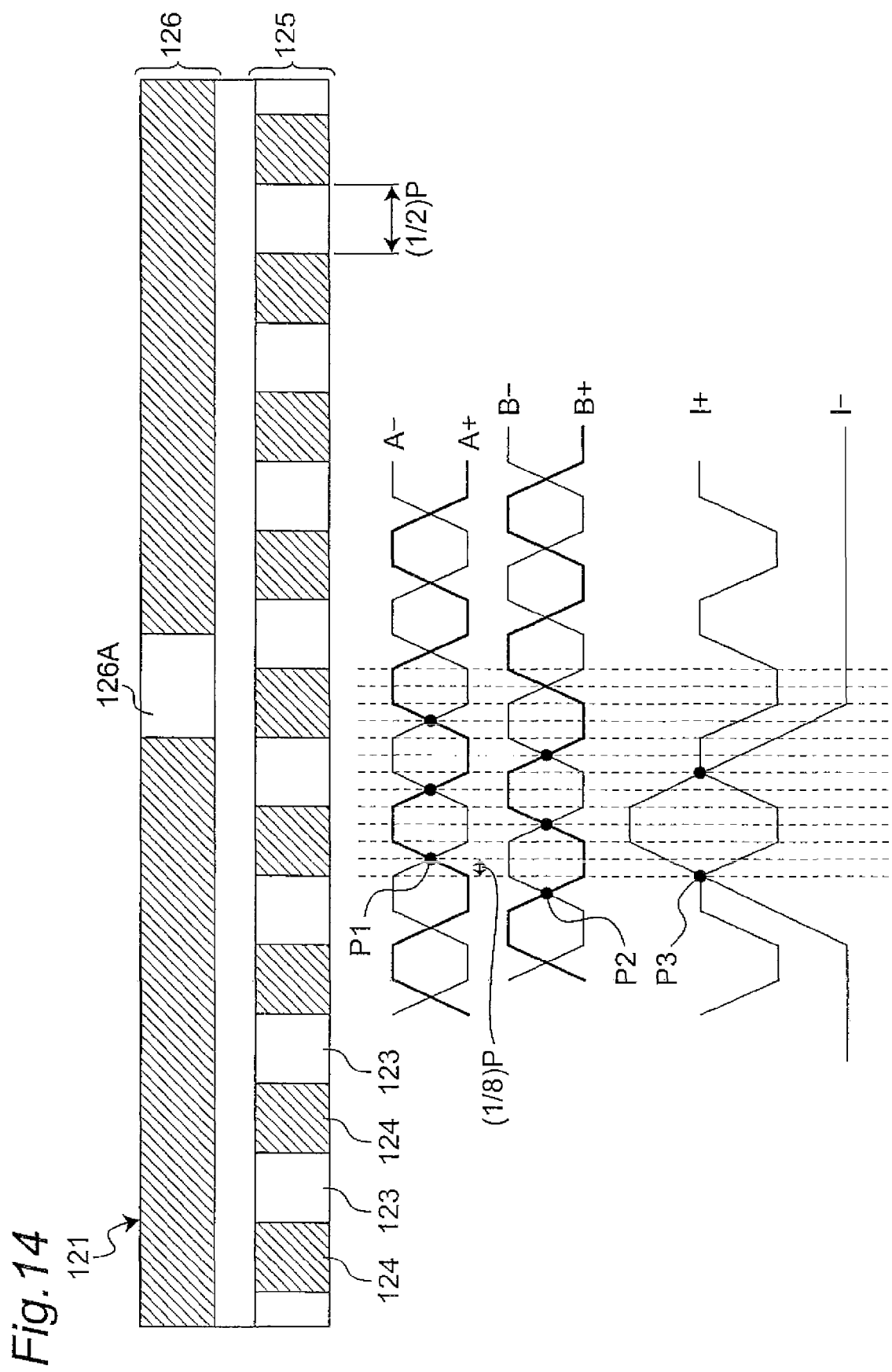
FIG. 14 is a waveform chart showing an output signal waveform of the sixth embodiment.

Description is now given of an optical encoder in a sixth embodiment of the invention with reference to FIG. 13A, FIG. 13B and FIG. 14.

The sixth embodiment is composed of a moving object 121, a light receiving section 122, and a light emitting section (not shown). This light emitting section is constituted of an LED and the like. The moving object 121 is movable in the direction shown by arrow X1 or X2, and has an incremental pattern section 125 composed of a light-ON section 123 and a light-OFF section 124 alternately arranged in the moving direction. The moving object 121 has an index pattern forming section 126 adjacent to the incremental pattern section 125 in the direction orthogonal to the moving direction of the moving object 121. The index pattern forming section 126 has one index slit 126A as an index pattern section. The index slit 126A passes the light beam from the light emitting section to the light receiving section 122 side. The light-ON section 123 passes the light beam from the light emitting section to the light receiving section 122 side, whereas the light-OFF section 124 does not pass the light beam from the light emitting section to the light receiving section 122 side.

The index slit 126A of the index pattern forming section 126 has a width size of $\frac{3}{2}$ the moving direction size (width size) $(\frac{1}{2})P$ of the light-ON section 123 and the light-OFF section 124, i.e., a width size of $(\frac{3}{4})P$.

The light receiving section 122 has eight light receiving element lines, first to eighth light receiving elements 131-138 and one light receiving element 139 interposed in between the light receiving element lines 134 and 135.

The eight light receiving element lines and one light receiving element 139 are placed so as to receive the light beam from the incremental pattern section 125 of the moving object 121. The light receiving element lines 131, 132 have four light receiving elements 131-1 to 131-4 and 132-1 to 132-4 with $(\frac{1}{4})P$ width, and the light receiving element lines 133, 134 have four light receiving elements 133-1 to 133-4 and 134-1 to 134-4 with $(\frac{1}{4})P$ width. The light receiving element lines 135, 136 have four light receiving elements 135-1 to 135-4 and 136-1 to 136-4 with $(\frac{1}{4})P$ width, and the light receiving element lines 137, 138 have four light receiving elements 137-1 to 137-4 and 138-1 to 138-4 with $(\frac{1}{4})P$ width. The light receiving element 139 has a width size of $(\frac{3}{4})P$.

Further, the light receiving section 122 has a light receiving element 140. The light receiving element 140 is adjacent to the light receiving element 139 and the light receiving element 135-1 at an interval in the direction orthogonal to the arrangement direction of the light receiving element lines 131 to 138. The light receiving elements 140 and 139 are index pulse detecting photodiodes. The light receiving elements included in each of the light receiving element lines 131 to 138 are constituted of photodiodes, and each photodiode is arranged in the moving direction.

It is to be noted that the moving object 121 and the light receiving section 122 shown in FIG. 13A are placed so that the light beam which transmits the incremental pattern section 125 of the moving object 121 comes incident into the light receiving element lines 131 to 138 and the light receiving element 139 of the light receiving section 122 while the light beam which transmits the index pattern forming section 126 of the moving object 121 comes incident into the light receiving element 140.

The sixth embodiment has an output section composed of first, second and third differential amplifiers 101, 102 and 103 shown in FIG. 13B.

Eight light receiving signals A+ outputted by the light receiving elements 131-4, 132-4, 133-4, 134-4 and the light receiving elements 135-1, 136-1, 137-1, 138-1 are electrically added together, and are inputted into a non-inverting input terminal of the first differential amplifier 101 shown in FIG. 13B via a current voltage conversion section (not shown). Moreover, eight light receiving signals A− outputted by the light receiving elements 131-2, 132-2, 133-2, 134-2 and the light receiving elements 135-3, 136-3, 137-3, 138-3 are electrically added together, and are inputted into an inverting input terminal of the first differential amplifier 101 shown in FIG. 13B via the current voltage conversion section (not shown). An output signal of the first differential amplifier 101 makes an incremental channel signal A.

Moreover, eight light receiving signals B+ outputted by the light receiving elements 131-3, 132-3, 133-3, 134-3 and the light receiving elements 135-4, 136-4, 137-4, 138-4 output are electrically added together, and are inputted into a non-inverting input terminal of the second differential amplifier 102 shown in FIG. 13B via the current voltage conversion section (not shown). Moreover, eight light receiving signals B− outputted by the light receiving elements 131-1, 132-1, 133-1, 134-1 and the light receiving elements 135-2, 136-2, 137-2, 138-2 are electrically added together, and are inputted into an inverting input terminal of the second differential amplifier 102 shown in FIG. 13B via the current voltage conversion section (not shown). An output signal of the second differential amplifier 102 makes an incremental channel signal B.

A light receiving signal I+ outputted by the light receiving element 139 is inputted into a non-inverting input terminal of the third differential amplifier 103 shown in FIG. 13B via the current voltage conversion section (not shown). A light receiving signal I− outputted by the light receiving element 140 is inputted into an inverting input terminal of the third differential amplifier 103 shown in FIG. 13B via the current voltage conversion section (not shown). An output signal of the third differential amplifier 103 makes an index channel signal ID.

According to the sixth embodiment, the movement information of the moving object 121 can be acquired by the incremental channel signals A, B outputted by the first and second differential amplifiers 101, 102. The reference position information of the moving object 121 can be acquired by the index channel signal ID outputted by the third differential amplifier 103.

According to the sixth embodiment, as shown in FIG. 14, a cross point P1 between the light receiving signal A+ and the light receiving signal A−, a cross point P2 between the light receiving signal B+ and the light receiving signal B−, and a cross point P3 between the light receiving signal I+ and the light receiving signal I− are out of phase with each other. Therefore, the incremental channel signal A, the incremental channel signal B and the index channel signal ID are out of phase with each other.

Therefore, according to this embodiment, even when the signal processing circuits of the output section are constituted from the same chip, mutual interference between the index channel signal ID and the incremental channel signals A, B can be suppressed. As a consequence, the phase shift and distortion of the incremental channel signal can be suppressed, so that malfunction such as, for example, chattering phenomenon and logic reversal can be avoided and thereby movement information and reference position information can be acquired with sufficient precision at low cost.

Moreover, in this embodiment, the third differential amplifier 103 takes a differential between the light receiving signal I+ outputted by the light receiving element 139 and the light receiving signal I− outputted by the light receiving element 140 to output an index channel signal ID. Thus, by taking the differential between the light receiving signals I+ and I−, it becomes possible to suppress malfunction such as signal inversion caused by disturbance light and the like.

Seventh Embodiment

Figure 15:
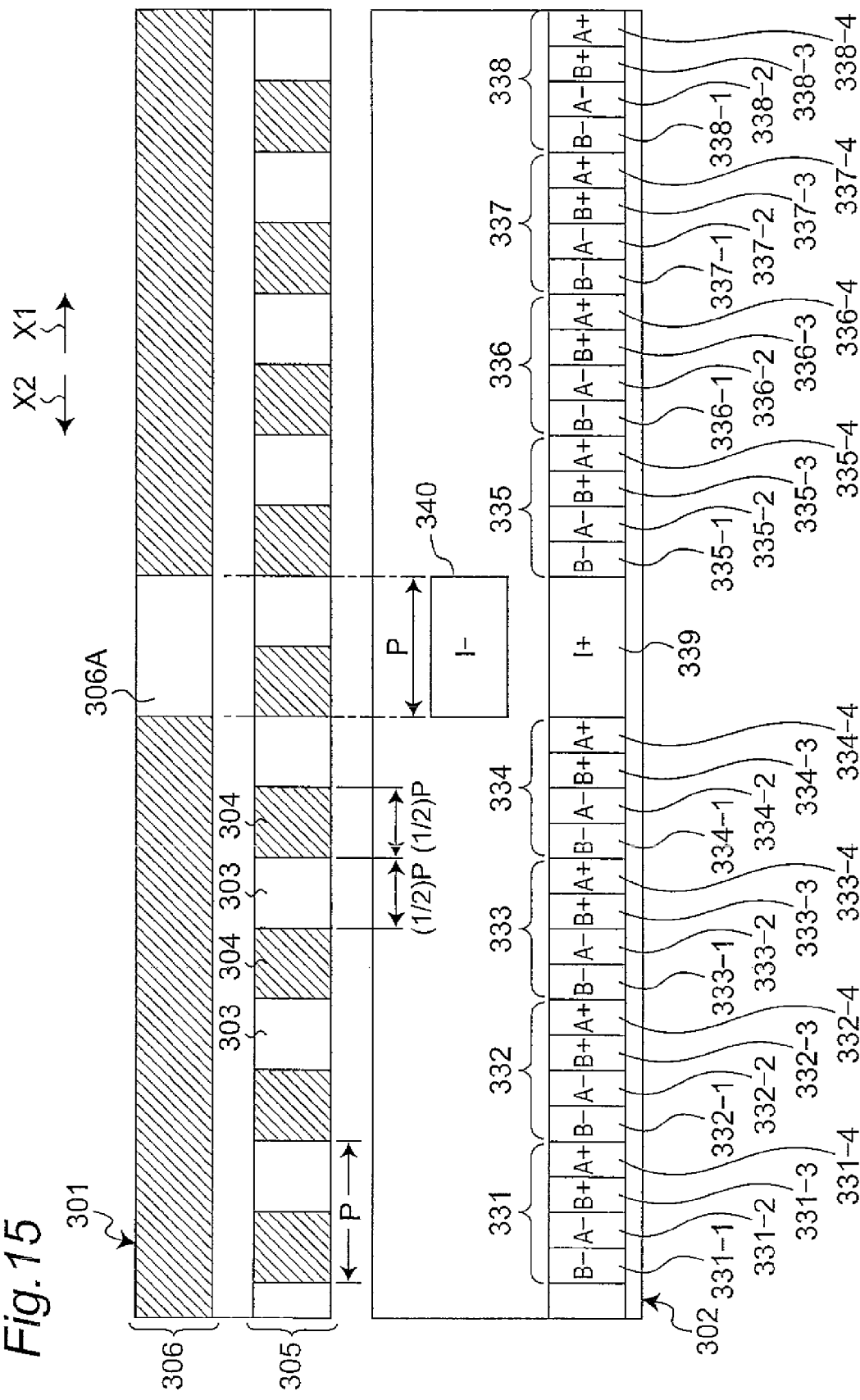
FIG. 15 is a schematic view showing an optical encoder in a seventh embodiment of the present invention.
Figure 16:
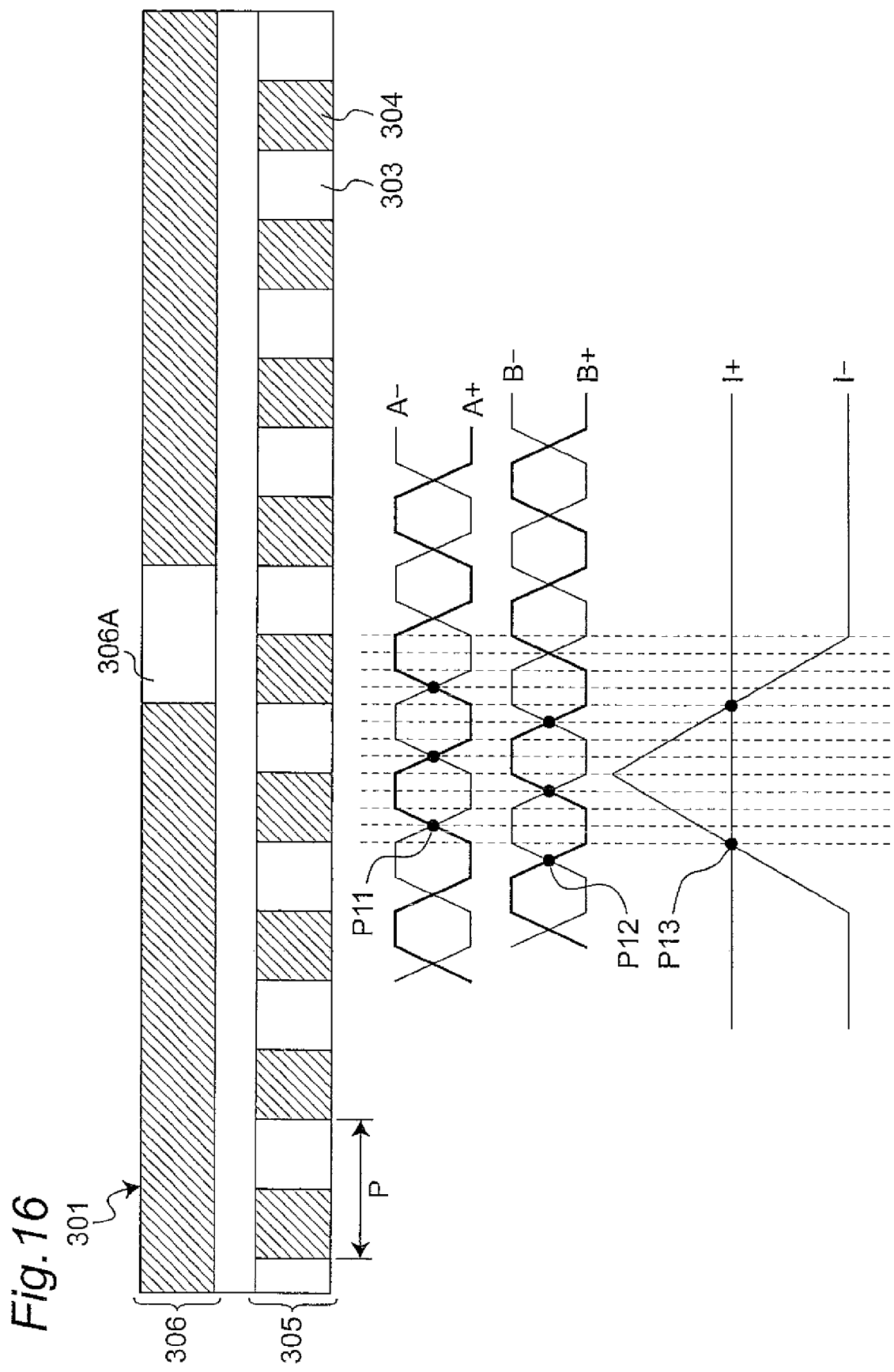
FIG. 16 is a waveform chart showing an output signal waveform of the seventh embodiment.

Description is now given of an optical encoder in a seventh embodiment of the invention with reference to FIG. 15 and FIG. 16.

The seventh embodiment is composed of a moving object 301, a light receiving section 302, and a light emitting section (not shown). This light emitting section is constituted of an LED and the like. The moving object 301 is movable in the direction shown by arrow X1 or X2, and has an incremental pattern section 305 composed of a light-ON section 303 and a light-OFF section 304 alternately arranged in the moving direction.

The moving object 301 has an index pattern forming section 306 adjacent to the incremental pattern section 305 in the direction orthogonal to the moving direction of the moving object 301. The index pattern forming section 306 has one index slit 306A as an index pattern section. The index slit 306A passes the light beam from the light emitting section to the light receiving section 302 side. The light-ON section 303 passes the light beam from the light emitting section to the light receiving section 302 side, whereas the light-OFF section 304 does not pass the light beam from the light emitting section to the light receiving section 302 side.

The index slit 306A of the index pattern forming section 306 has a width size twice the moving direction size (width size) (½)P of the light-ON section 303 and the light-OFF section 304, i.e., a width size of 1 pitch.

The light receiving section 302 has eight light receiving element lines, first to eighth light receiving elements 331 to 338 and one light receiving element 339 interposed in between the light receiving element lines 334 and 335.

The light receiving element 339 has 1 pitch width. The eight light receiving element lines 331 to 338 and one light receiving element 339 are placed so as to receive the light beam from the incremental pattern section 305 of the moving object 301. The light receiving element lines 331, 332 have four light receiving elements 331-1 to 331-4 and 332-1 to 332-4 with (¼)P width, and the light receiving element lines 333, 334 have four light receiving elements 333-1 to 333-4 and 334-1 to 334-4 with (¼) P width. The light receiving element lines 335, 336, 337 have four light receiving elements 335-1 to 335-4, 336-1 to 336-4, and 337-1 to 337-4 with (¼)P width. The light receiving element line 338 has four light receiving elements 338-1 to 338-4 with (¼)P width.

Further, the light receiving section 302 has a light receiving element 340 with 1 pitch width. The light receiving element 340 is adjacent to the light receiving element 339 at a specified interval in the direction orthogonal to the arrangement direction of the light receiving element lines 331 to 338. These light receiving elements 340 and 339 have 1 pitch width, and are constituted of index pulse detecting photodiodes. The light receiving elements included in each of the light receiving element lines 331 to 338 are constituted of photodiodes, and each photodiode is arranged in the moving direction.

The seventh embodiment has an output section composed of first, second and third differential amplifiers 101, 102 and 103 shown in FIG. 13B as in the aforementioned sixth embodiment.

In the seventh embodiment, eight light receiving signals A+ outputted by the light receiving elements 331-4, 332-4, 333-4, 334-4 and the light receiving elements 335-4, 336-4, 337-4, 338-4 are electrically added together, and are inputted into a non-inverting input terminal of the first differential amplifier 101 shown in FIG. 13B via a current voltage conversion section (not shown). Moreover, eight light receiving signals A− outputted by the light receiving elements 331-2, 332-2, 333-2, 334-2 and the light receiving elements 335-2, 336-2, 337-2, 338-2 are electrically added together, and are inputted into an inverting input terminal of the first differential amplifier 101 shown in FIG. 13B via the current voltage conversion section (not shown) An output signal of the first differential amplifier 101 makes an incremental channel signal A.

In the seventh embodiment, eight light receiving signals B+ outputted by the light receiving elements 331-3, 332-3, 333-3, 334-3 and the light receiving elements 335-3, 336-3, 337-3, 338-3 are electrically added together, and are inputted into a non-inverting input terminal of the second differential amplifier 102 shown in FIG. 13B via the current voltage conversion section (not shown). Moreover, eight light receiving signals B− outputted by the light receiving elements 331-1, 332-1, 333-1, 334-1 and the light receiving elements 335-1, 336-1, 337-1, 338-1 are electrically added together, and are inputted into an inverting input terminal of the second differential amplifier 102 shown in FIG. 13B via the current voltage conversion section (not shown). An output signal of the second differential amplifier 102 makes an incremental channel signal B.

Moreover, in the seventh embodiment, a light receiving signal I+ outputted by the light receiving element 339 is inputted into a non-inverting input terminal of the third differential amplifier 103 shown in FIG. 13B via the current voltage conversion section (not shown). A light receiving signal I− outputted by the light receiving element 340 is inputted into an inverting input terminal of the third differential amplifier 103 shown in FIG. 13B via the current voltage conversion section (not shown) An output signal of the third differential amplifier 103 makes an index channel signal ID.

According to the seventh embodiment, the movement information of the moving object 301 can be acquired by the incremental channel signals A, B outputted by the first and second differential amplifiers 101, 102. The reference position information of the moving object 301 can be acquired by the index channel signal ID outputted by the third differential amplifier 103.

According to the seventh embodiment, as shown in FIG. 16, a cross point P11 between the light receiving signal A+ and the light receiving signal A−, a cross point P12 between the light receiving signal B+ and the light receiving signal B−, and a cross point P13 between the light receiving signal I+ and the light receiving signal I− are out of phase with each other. Therefore, the incremental channel signal A, the incremental channel signal B and the index channel signal ID are out of phase with each other.

Therefore, according to this embodiment, even when the signal processing circuits of the output section are constituted from the same chip, mutual interference between the index channel signal ID and the incremental channel signals A, B can be suppressed. As a consequence, the phase shift and distortion of the incremental channel signal can be suppressed, so that malfunction such as, for example, chattering phenomenon and logic reversal can be avoided and thereby movement information and reference position information can be acquired with sufficient precision at low cost.

According to the seventh embodiment, as shown in FIG. 16, the light receiving signal I+ of the light receiving element 340 which is an index pulse detecting photodiode provides a direct-current waveform. Consequently, the cycle variation of the index channel signal ID which is a differential output between the light receiving signal I+ and the light receiving signal I− can be suppressed. Moreover, the width (moving direction size) of the light receiving element 340 and the width (moving direction size) of the light receiving element 339 are set to be the same 1 pitch, so that the parasitic capacitance of the photodiodes which constitute each of the light receiving elements 340, 339 can be equalized, and thereby malfunction due to power supply noise and the like can be suppressed.

Moreover, according to the seventh embodiment, the light receiving elements in each of the eight light receiving element lines 331 to 338 should be arranged in the same order of the light receiving signals B−, A−, B+, A+. This eliminates the necessity for each light receiving element line to change the arrangement order of the light receiving elements corresponding to the respective light receiving signals B−, A−, B+, A+ so that the compatibility of the arrangement of the light receiving elements can be ensured.

Eighth Embodiment

Figure 17A:
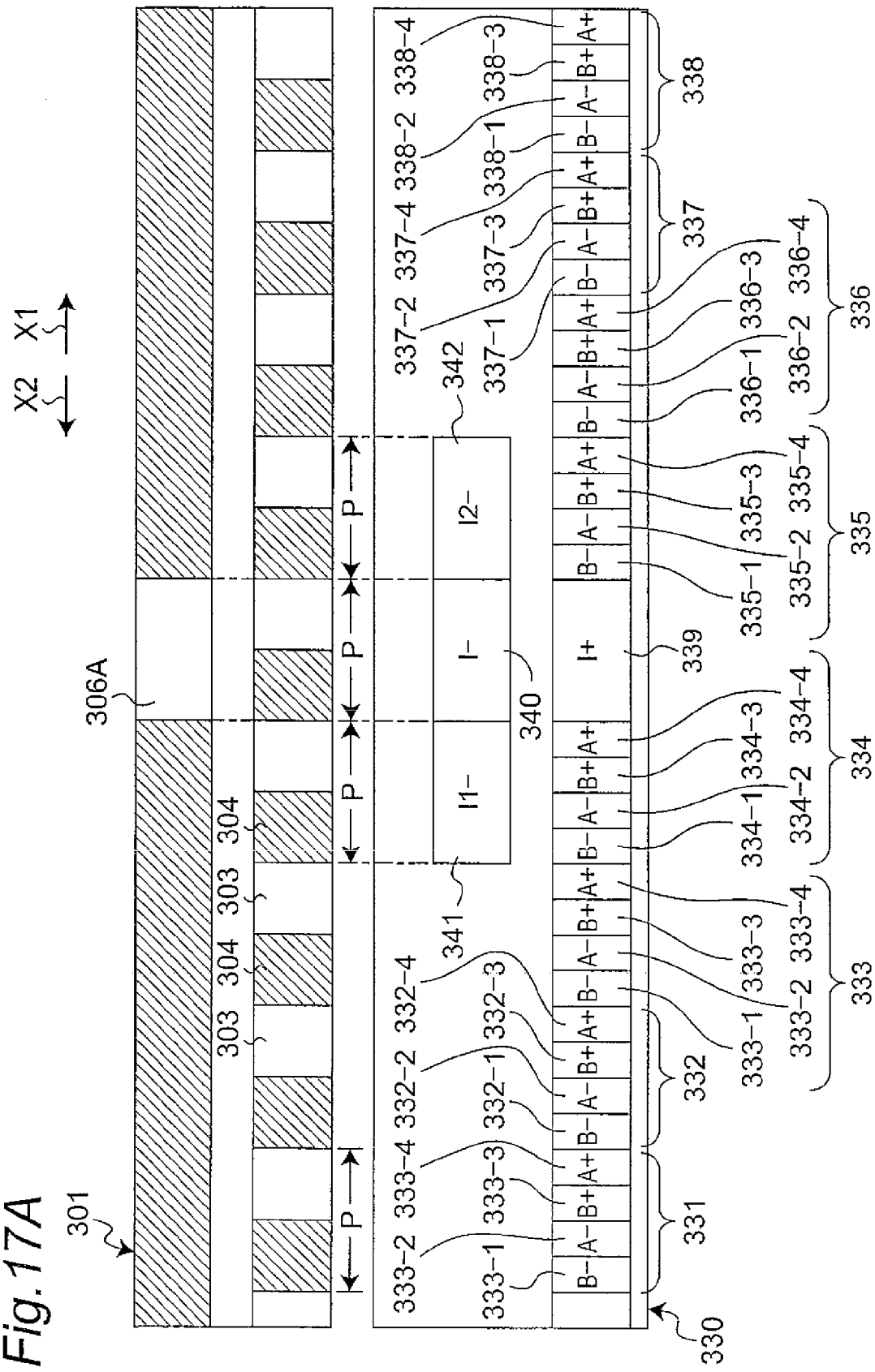
FIG. 17A is a schematic view showing an optical encoder in a eighth embodiment of the present invention.
Figure 17B:
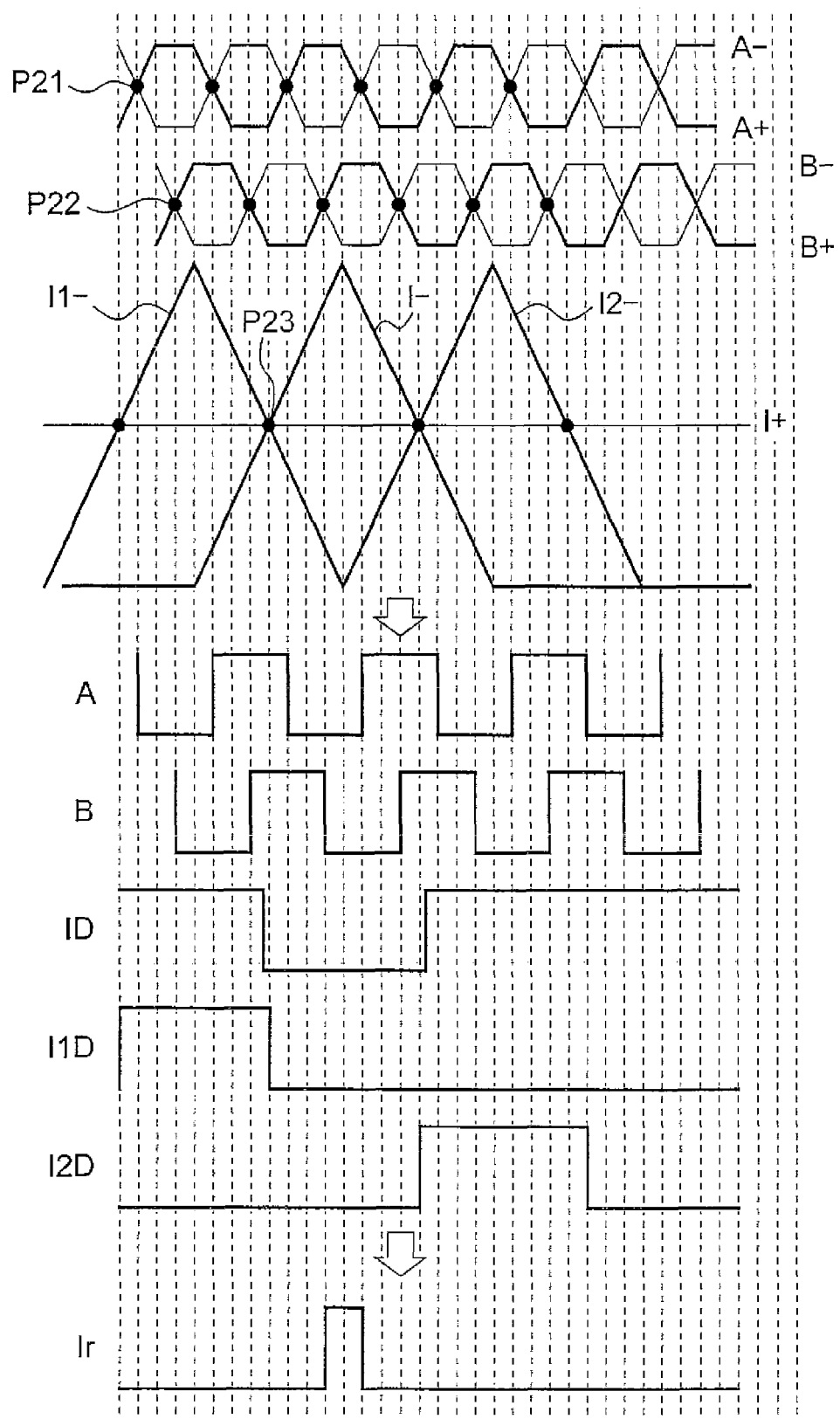
FIG. 17B is a waveform chart showing each signal waveform in the eighth embodiment.

Description is now given of an optical encoder in an eighth embodiment of the invention with reference to FIG. 17A and FIG. 17B. The eighth embodiment is equivalent to a modified example of the above-mentioned seventh embodiment. Since the eighth embodiment is different from the above-mentioned seventh embodiment only in the point that the light receiving section 302 of the above-mentioned seventh embodiment is replaced with a light receiving section 330 and in the configuration of the output section, description is mainly given of the point different from the above-mentioned seventh embodiment.

The light receiving section 330 included in the eighth embodiment, similar to the light receiving section 302 of the above-mentioned seventh embodiment, has eight light receiving element lines 331 to 338 and one light receiving element 339 interposed in between the light receiving element lines 334 and 335. The light receiving section 330 has one pair of light receiving elements 341, 342 which are adjacent to both sides of the moving direction of the light receiving element 340 with 1 pitch width as in the case of the light receiving section 302. The light receiving elements 341, 342 have a moving direction size of 1 pitch as with the light receiving element 340. The light receiving element 340 constitutes a first index light receiving element, while one pair of the light receiving elements 341, 342 constitutes a second index light receiving element.

Moreover, the eighth embodiment has an output section composed of first to fifth differential amplifiers 105, 106, 107, 108, 109 and a NOR circuit 110 shown in FIG. 13D.

In the eighth embodiment, eight light receiving signals A+ outputted by the light receiving elements 331-4, 332-4, 333-4, 334-4 and the light receiving elements 335-4, 336-4, 337-4, 338-4 are electrically added together, and are inputted into a non-inverting input terminal of the first differential amplifier 105 shown in FIG. 13D via a current voltage conversion section (not shown). Moreover, eight light receiving signals A− outputted by the light receiving elements 331-2, 332-2, 333-2, 334-2 and the light receiving elements 335-2, 336-2, 337-2, 338-2 are electrically added together, and are inputted into an inverting input terminal of the first differential amplifier 105 shown in FIG. 13D via the current voltage conversion section (not shown). An output signal of the first differential amplifier 105 makes an incremental channel signal A. The signal waveform of the incremental channel signal A is shown in FIG. 17B.

In the eighth embodiment, eight light receiving signals B+ outputted by the light receiving elements 331-3, 332-3, 333-3, 334-3 and the light receiving elements 335-3, 336-3, 337-3, 338-3 are electrically added together, and are inputted into a non-inverting input terminal of the second differential amplifier 106 shown in FIG. 13D via the current voltage conversion section (not shown). Moreover, eight light receiving signals B− outputted by the light receiving elements 331-1, 332-1, 333-1, 334-1 and the light receiving elements 335-1, 336-1, 337-1, 338-1 are electrically added together, and are inputted into an inverting input terminal of the second differential amplifier 106 shown in FIG. 13D via the current voltage conversion section (not shown). An output signal of the second differential amplifier 106 makes an incremental channel signal B. The signal waveform of the incremental channel signal B is shown in FIG. 17B.

Moreover, in the eighth embodiment, a light receiving signal I+ outputted by the light receiving element 339 is inputted into a non-inverting input terminal of the third differential amplifier 107 shown in FIG. 13D via the current voltage conversion section (not shown). The light receiving signal I+ makes an incremental channel signal used as reference.

A light receiving signal I− outputted by the light receiving element 340 is inputted into an inverting input terminal of the third differential amplifier 107 shown in FIG. 13D via the current voltage conversion section (not shown). An output signal of the third differential amplifier 107 makes an index channel signal ID. The signal waveform of the index channel signal ID is shown in FIG. 17B.

Moreover, in the eighth embodiment, a light receiving signal I1− outputted by the light receiving element 341 is inputted into a non-inverting input terminal of the fourth differential amplifier 108 shown in FIG. 13D via the current voltage conversion section (not shown). A light receiving signal I+ outputted by the light receiving element 339 is inputted into an inverting input terminal of the fourth differential amplifier 108 shown in FIG. 13D via the current voltage conversion section (not shown). An output signal of the fourth differential amplifier 108 makes a first secondary index channel signal I1D. The signal waveform of the first secondary index channel signal I1D is shown in FIG. 17B.

Moreover, in the eighth embodiment, a light receiving signal I2− outputted by the light receiving element 342 is inputted into a non-inverting input terminal of the fifth differential amplifier 109 shown in FIG. 13D via the current voltage conversion section (not shown). A light receiving signal I+ outputted by the light receiving element 339 is inputted into an inverting input terminal of the fifth differential amplifier 109 shown in FIG. 13D via the current voltage conversion section (not shown). An output signal of the fifth differential amplifier 109 makes a second secondary index channel signal I2D. The signal waveform of the second secondary index channel signal I2D is shown in FIG. 17B.

Moreover in the eighth embodiment, the incremental channel signals A, B, the index channel signal ID, and the first, second secondary index channel signals I1D, I2D outputted by the first to fifth differential amplifiers 105 to 109 are inputted into the NOR circuit 110. The NOR circuit 110 performs logical operation of non-disjunction of the five signals A, B, ID, I1D, I2D, and outputs an index channel signal Ir after the logical operation. The index channel signal Ir after the logical operation is set at H level only when all the five signals A, B, ID, I1D, I2D are at L level as shown in the signal waveform chart of FIG. 17B. When at least one of the five signals A, B, ID, I1D, I2D is at H level, the index channel signal Ir is set at L level.

In the output section of the eighth embodiment, the NOR output of the three signals A, B, ID and the first, second secondary index channel signals I1D, I2D is used as an index channel signal Ir. Consequently, in the case where the infiltration of light is large or the amount of light is biased toward the index slit 306A side during light reception by the light receiving element 339, it becomes possible to suppress such malfunction that the level of the light receiving signal I+ shown in FIG. 17B falls and the pulse width of the index channel signal ID is widened so that a plurality of index pulses of the index channel signal Ir after logical operation are outputted.

According to the eighth embodiment, as shown in FIG. 17B, a cross point P21 between the light receiving signal A+ and the light receiving signal A−, a cross point P22 between the light receiving signal B+ and the light receiving signal B−, and a cross point P23 between the light receiving signal I+ and the light receiving signal I− are out of phase with each other. Therefore, the incremental channel signal A, the incremental channel signal B and the index channel signal ID are out of phase with each other.

Therefore, according to this embodiment, even when the signal processing circuits of the output section are constituted from the same chip, mutual interference between the index channel signal ID and the incremental channel signals A, B can be suppressed As a consequence, the phase shift and distortion of the incremental channel signal can be suppressed, so that malfunction such as, for example, chattering phenomenon and logic reversal can be avoided and thereby movement information and reference position information can be acquired with sufficient precision at low cost.

Moreover, in the eighth embodiment, the third differential amplifier 107 is provided with a hysteresis characteristic, and as shown in the waveform chart of FIG. 17B, the falling edge of the index channel signal ID is made out of phase with the falling edge of the first secondary index channel signal I1D, while the leading edge of the index channel signal ID is made out of phase with the leading edge of the second secondary index channel signal I2D. This avoids occurrence of chattering at the time of output change of the index channel signal ID, the first secondary index channel signal I1D and the second secondary index channel signal I2D.

Ninth Embodiment

Description is now given of an optical encoder in a ninth embodiment of the invention The ninth embodiment is equivalent to a modified example of the above-mentioned seventh embodiment. Since the ninth embodiment is different from the above-mentioned seventh embodiment only in the configuration of the output section, description is mainly given of the point different from the above-mentioned seventh embodiment.

Figure 13C:
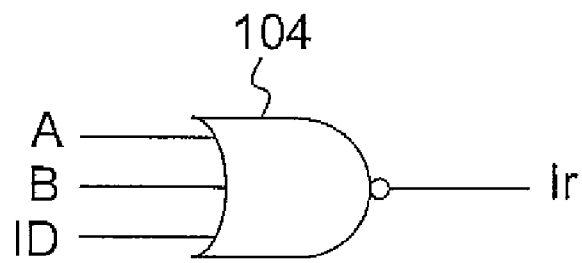
FIG. 13C is a view showing a NOR circuit included in an output section of an eighth embodiment of the invention.
Figure 19:
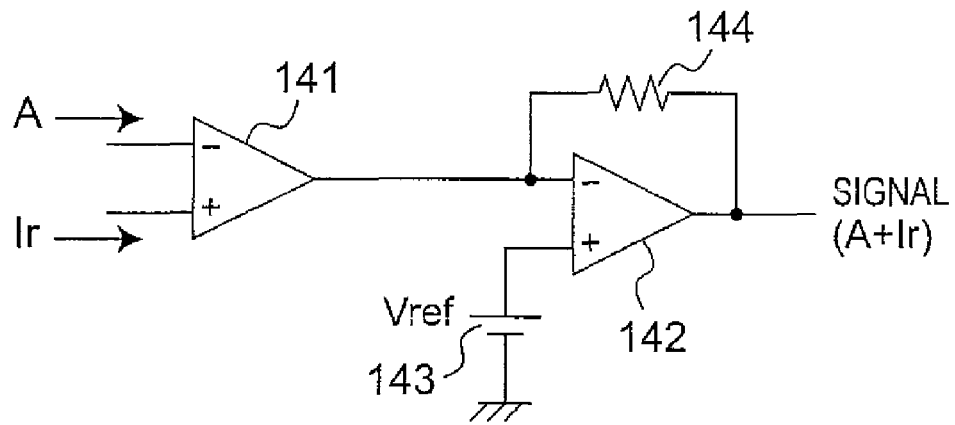
FIG. 19 is a view showing a circuit included in an output section of the ninth embodiment.

The output section included in the ninth embodiment has a NOR circuit 104 shown in FIG. 13C and a circuit shown in FIG. 19 in addition to three differential amplifiers 101, 102, 103 shown in FIG. 13B. As shown in FIG. 13C, the NOR circuit 104 receives inputs of incremental channel signals A, B outputted by the first and second differential amplifier 101, 102 of FIG. 13B and an index channel signal ID outputted by the third differential amplifier 103. The NOR circuit 104 performs logical operation of non-disjunction of the incremental channel signals A, B and the index channel signal ID, and outputs an index channel signal Ir after the logical operation. The index channel signal Ir after the logical operation is set at H level only when the incremental channel signals A, B and the index channel signal ID are at L level as shown in the signal waveform chart of FIG. 18. When at least one of the signals A, B, and ID is at H level, the index channel signal Ir is set at L level.

Then, the index channel signal Ir outputted by the NOR circuit 104 and the incremental channel signal A are inputted into a differential amplifier 141 shown in FIG. 19. An output signal of the differential amplifier 141 is inputted into a differential amplifier 142. The differential amplifier 142 is connected to a reference voltage source 143 and a feedback resister 144. As shown in the waveform chart of FIG. 18, the differential amplifier 142 outputs a composite signal (A+Ir) containing an incremental channel signal A appearing on one side of the reference voltage Vref sent from the reference voltage source 143 (in a first voltage range beyond the reference voltage Vref) and an index channel signal Ir after the logical operation appearing on the other side of the reference voltage Vref (in a second voltage range below the reference voltage Vref). Therefore, according to the ninth embodiment, it becomes possible to reduce the number of output signals without reducing the amount of information.

Therefore, according to the ninth embodiment, compared to a two-phase output device which outputs the incremental channel signals A, B but does not output the index channel signal, increase in mounting area can be suppressed and production facilities for producing the two-phase output devices can also be used for producing the device of the invention.

The incremental channel signals A, B are generally two-phase signals different in phase by 90 degrees. The moving direction is detected by the sequence of the two-phase incremental channel signals A, B. Therefore, when the two-phase incremental channel signals A, B are made to be outputted to either one side or the other side of the reference voltage, it becomes impossible to detect the moving direction or it is necessary to lower the resolution to detect the moving direction disadvantageously. In the case where the index channel signal and the incremental channel signal are composed, such disadvantage is not encountered.

Although the index channel signal Ir and the incremental channel signal A were composed in the ninth embodiment, the index channel signal Ir and the incremental channel signal B may be composed. Moreover, the incremental channel signal A or B and the index channel signal ID in any one of the aforementioned first to fourth embodiments may be inputted into the differential amplifier 141 shown in FIG. 19.

Figure 20:
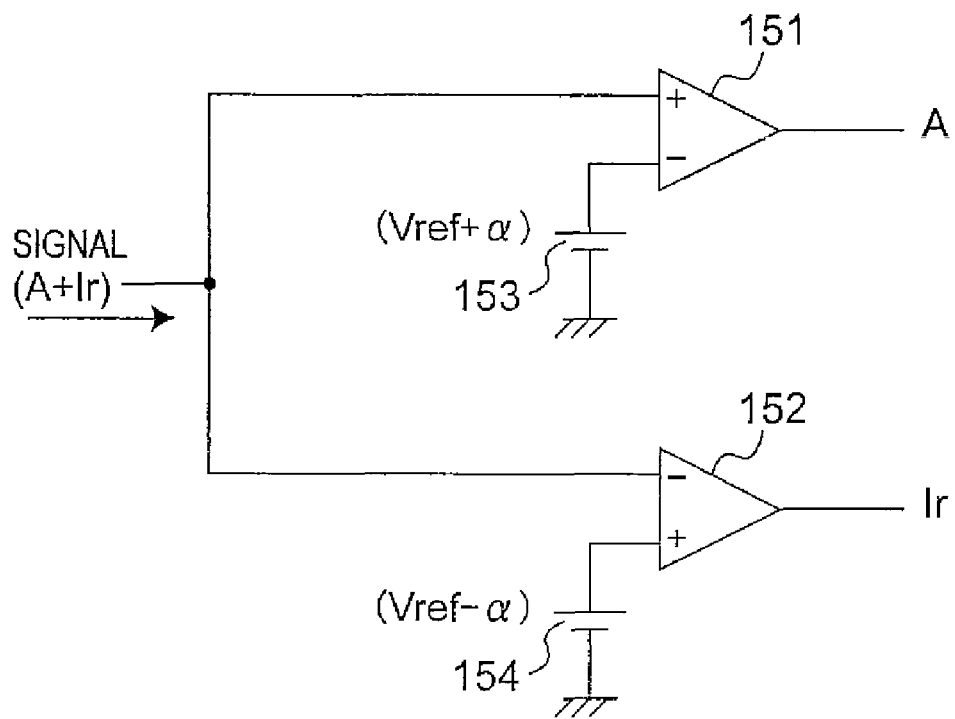
FIG. 20 is a view showing a circuit included in electronic equipment having the optical encoder of the ninth embodiment.

In electronic equipment using the composite signal (A+Ir) outputted by the differential amplifier 142, by including a circuit shown in FIG. 20, it becomes possible to decompose the composite signal (A+Ir) into an incremental channel signal A and an index channel signal Ir. The circuit, as shown in FIG. 20, has differential amplifiers 151 and 152, and a voltage source 153 is connected to an inverting input terminal of the differential amplifier 151, while a voltage source 154 is connected to a non-inverting input terminal of the differential amplifier 152. The composite signal (A+Ir) is inputted into a non-inverting input terminal of the differential amplifier 151 and into an inverting input terminal of the differential amplifier 152. In this case, the voltage source 153 outputs a voltage (Vref+α) slightly larger than the reference voltage Vref by the reference voltage source 143. The slightly larger voltage refers to the voltage value large enough to prevent an influence of the offset of the incremental signal A. The voltage source 154 outputs a voltage (Vref−α) slightly smaller than the reference voltage Vref by the reference voltage source 143. The slightly smaller voltage refers to the voltage value small enough to prevent an influence of the offset of the index channel signal Ir. With the circuit shown in FIG. 20, the differential amplifier 151 outputs the incremental channel signal A as a logic signal of 1, 0, while the differential amplifier 152 outputs the index channel signal Ir as a logic signal of 1, 0.

In electronic equipment having the optical encoder according to the aforementioned first to ninth embodiments, movement information (incremental channel signal) and reference position information (index channel signal) can be acquired with sufficient precision at low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An optical encoder comprising:
a light emitting section; and
a light receiving section having a plurality of light receiving elements placed so as to be aligned in one direction in an area where a light beam from the light emitting section may reach, for detecting movement of a moving object which is composed of a light-ON section for enabling the light beam to come incident into the light receiving element when the moving object passes through a predetermined position corresponding to the light receiving element, and a light-OFF section for disabling the light beam from coming incident into the light receiving element when the moving object passes through a predetermined position corresponding to the light receiving element, the light-ON section and the light-OFF section alternately passing through the predetermined position when the moving object moves in the one direction,
the moving object also including an index pattern section placed in a predetermined reference position,
the optical encoder further comprising an output section for receiving inputs of a first light receiving signal outputted by the light receiving element when the light-ON section and the light-OFF section of the moving object pass through the predetermined position corresponding to the light receiving element and a second light receiving signal outputted by the light receiving element when the index pattern section of the moving object passes through the predetermined position corresponding to the light receiving element,
the output section outputting an incremental channel signal indicating movement information of the moving object based on at least the first light receiving signal out of the first and the second light receiving signals, while outputting an index channel signal indicating the reference position of the moving object based on at least the second light receiving signal out of the first and the second light receiving signals, wherein
the incremental channel signal and the index channel signal are out of phase with each other, and
the output section outputs a composite signal composed of the incremental channel signal and the index channel signal, in which the incremental channel signal is present in one voltage range out of a first voltage range higher than a reference voltage and a second voltage range lower than the reference voltage, while the index channel signal is present in the other voltage range out of the two voltage ranges.

2. The optical encoder according to claim 1, wherein
the output section has a logical operation section for receiving inputs of light receiving signals outputted by the first and the second light receiving elements among a plurality of the light receiving elements and outputting a result of logical operation of both the light receiving signals as an index channel signal, and wherein
a combination of a light incident state and a light non-incident state of the first and second light receiving elements when the index pattern section passes through the predetermined position corresponding to at least either one of the first light receiving element and the second light receiving element is different from a combination of a light incident state and a light non-incident state of the first and second light receiving elements when the light-ON section or the light-OFF section passes through the predetermined position corresponding to the first and second light receiving elements.

3. Electronic equipment including the optical encoder according to claim 1.

4. Electronic equipment including the optical encoder according to claim 2.

* * * * *